US008322481B2

(12) United States Patent
Satake et al.

(10) Patent No.: US 8,322,481 B2
(45) Date of Patent: Dec. 4, 2012

(54) TRAVELING CONTROL APPARATUS FOR HYDRAULIC TRAVELING VEHICLE

(75) Inventors: Hidetoshi Satake, Ishioka (JP); Katsuaki Kodaka, Abiko (JP); Yuuki Gotou, Tsuchiura (JP); Kazuhiro Ichimura, Kasumigaura (JP); Wataru Kondou, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 769 days.

(21) Appl. No.: 12/441,489

(22) PCT Filed: Dec. 27, 2007

(86) PCT No.: PCT/JP2007/075086
§ 371 (c)(1),
(2), (4) Date: Mar. 16, 2009

(87) PCT Pub. No.: WO2008/081856
PCT Pub. Date: Jul. 10, 2008

(65) Prior Publication Data
US 2009/0238696 A1 Sep. 24, 2009

(30) Foreign Application Priority Data

Dec. 28, 2006 (JP) ................................. 2006-355219
Dec. 28, 2006 (JP) ................................. 2006-355601

(51) Int. Cl.
*B60K 17/356* (2006.01)
(52) U.S. Cl. ........................................ 180/307; 180/305
(58) Field of Classification Search .................. 180/305, 180/306, 307, 308
See application file for complete search history.

(56) References Cited

U.S. PATENT DOCUMENTS

| 5,709,282 | A  | * | 1/1998 | Akira et al. ............... 180/307 |
| 5,784,883 | A  | * | 7/1998 | Ohkura et al. ............. 60/327  |
| 6,209,675 | B1 | * | 4/2001 | Hayashi et al. ............ 180/307 |
| 6,336,518 | B1 | * | 1/2002 | Matsuyama ............... 180/306  |
| 6,454,033 | B1 | * | 9/2002 | Nathan et al. ............. 180/65.1|
| 6,857,494 | B2 | * | 2/2005 | Kobayashi et al. ......... 180/243 |
| 7,273,124 | B2 | * | 9/2007 | Tatsuno et al. ............ 180/305 |
| 7,506,717 | B2 | * | 3/2009 | Tatsuno et al. ............ 180/307 |
| 7,997,360 | B2 | * | 8/2011 | Smith ..................... 180/6.48 |
| 8,020,659 | B2 | * | 9/2011 | Schultz et al. ............ 180/301 |

FOREIGN PATENT DOCUMENTS

| EP | 0 735 298 A2 | 10/1996 |
| EP | 1 674 766 A1 | 6/2006  |
| JP | 8-270788 A   | 10/1996 |
| JP | 2001-295682 A| 10/2001 |
| JP | 3631620 B2   | 12/2004 |

* cited by examiner

*Primary Examiner* — Jeffrey J Restifo
(74) *Attorney, Agent, or Firm* — Mattingly & Malur, P.C.

(57) ABSTRACT

A rotational speed pickup 71 (traveling speed detection means), a hydraulic pressure sensor 72 (traveling operation detection means), a hydraulic pressure sensor 73 (drive status detection means), and a voltage sensor 74 (transmission shift position detection means) detect parameters regarding the traveling state of a hydraulic traveling vehicle. A control unit 80, a solenoid proportional valve 81, an engine control system 82, and a motor regulator 33 determine the operating state of the hydraulic traveling vehicle based on the parameters regarding the traveling state, and control the equivalent displacement of the traveling system including a hydraulic traveling motor 14 and the maximum flow rate supplied to the hydraulic traveling motor 14 according to the result of determination. The pump flow rate and motor displacement are controlled according to the traveling state in this way, thereby ensuring favorable traveling performance without degrading the fuel efficiency.

19 Claims, 16 Drawing Sheets

FIG.5

| | | ACCELERATION OPERATION | SLOPE-ASCENDING STATE | DECELERATION OPERATION | SLOPE-DESCENDING STATE | NORMAL |
|---|---|---|---|---|---|---|
| TRAVELING SPEED | km/h | NOT CARE | >10 | >10 | >10 | STATE OTHER THAN COMBINATIONS SHOWN AT LEFT |
| TRAVELING COMMAND PRESSURE | | >2/3 | >2/3 | <1/3 | >2/3 | |
| PUMP PRESSURE | MPa | >20 | >25 | NOT CARE | <3 | |
| TRANSMISSION SHIFT POSITION | | NOT CARE | NOT CARE | Hi | Hi | |
| MOTOR DISPLACEMENT | | MIDDLE | MIDDLE | MIDDLE | MIDDLE | SMALL |
| PUMP FLOW RATE | | LARGE | LARGE | SMALL | LARGE | SMALL |

TRAVELING CONTROL APPARATUS FOR HYDRAULIC TRAVELING VEHICLE

TECHNICAL FIELD

The present invention relates to a traveling control apparatus for a hydraulic traveling vehicle. More particularly, the present invention relates to a traveling control apparatus for a hydraulic traveling vehicle, such as a wheel-mounted hydraulic excavator, the traveling control apparatus including a variable-displacement hydraulic traveling motor driven by hydraulic fluid supplied from a hydraulic pump as drive means for traveling, and changing the displacement of the hydraulic traveling motor to control the traveling torque.

BACKGROUND ART

Generally, a hydraulically driven variable-displacement traveling motor is used as a traveling control apparatus for a hydraulic traveling vehicle, such as a wheel-mounted hydraulic excavator. If the loading pressure (travel loading pressure) of the traveling motor increases in the acceleration state, slope-ascending state, or the like, the traveling motor displacement is increased to generate required torque. In the deceleration state, an over-load relief valve provided in a hydraulic drive circuit for traveling controls the circuit pressure (brake pressure) and generates braking force in the traveling motor by means of the brake pressure to brake the vehicle body. With a thus-configured traveling control apparatus, if a traveling-directional vector of a vehicle body weight component with respect to the gradient exceeds the above-mentioned braking force during slope-descending operation, the speed of the vehicle body is increased by its weight, and a predetermined maximum vehicle body speed is exceeded, affecting the life of equipment used.

A traveling control apparatus described in Patent document 1, in a state where the traveling-directional vector of a vehicle body weight component with respect to the gradient is likely to exceed the above-mentioned braking force during slope-descending operation, detects the neutrality of the traveling pedal and increases the traveling motor displacement by use of an external command to increase the braking force, thus preventing the maximum speed during slope-descending operation from exceeding a predetermined speed.

A traveling control apparatus described in Patent document 2 supervises the vehicle speed in advance and, if the vehicle traveling speed exceeds a predetermined speed, increases the traveling motor displacement by use of an external command, thus preventing the maximum high speed during slope-descending operation from exceeding a predetermined speed.

On the other hand, some traveling control apparatuses for a hydraulic traveling vehicle, such as a wheel-mounted hydraulic excavator, enable setup of the high-horsepower operation mode. Such a traveling control apparatus makes it possible to set the high-horse power operation mode as required to increase the maximum engine speed to ensure high horsepower. Such a traveling control apparatus performs various control operations to prevent vehicle speed increase when the high-horsepower operation mode is set. For example, a conventional art described in Patent document 3 decreases the tilting (displacement) of the hydraulic pump to prevent vehicle speed increase when the high-horsepower operation mode is set. The art described in Patent document 3 provides a self-pressure tilting control mechanism for increasing the traveling motor displacement by the self-pressure of the traveling motor if the delivery pressure of the hydraulic pump becomes higher than a predetermined pressure. The art detects the delivery pressure of the hydraulic pump, increases the maximum engine speed if the detected delivery pressure becomes higher than a predetermined pressure, thus preventing vehicle speed increase when the high-horsepower operation mode is selected (when the maximum engine speed increases).

Patent document 1: JP-A-8-270788
Patent document 2: Japanese Patent No. 3631620
Patent document 3: JP-A-2001-295682

DISCLOSURE OF THE INVENTION

Problem to be Solved by the Invention

However, the above-mentioned conventional arts have the following problems.

For example, a driver may start slope-descending operation from flat road traveling while depressing the traveling pedal, without performing decelerative operation, to continue slope-descending operation. In such a case, the art described in Patent document 1 does not increase the traveling motor displacement because the traveling pedal is depressed. Accordingly, the vehicle speed increases making it difficult to perform stable slope-descending operation. The art described in Patent document 2 increases the traveling motor displacement after the traveling speed reaches the maximum speed on the flat road or exceeds a predetermined speed higher than the maximum speed. Therefore, the vehicle accelerates exceeding the predetermined speed.

In order to restrain vehicle acceleration during such slope-descending operation, it is possible to sufficiently increase the traveling motor displacement or the reduction gear ratio of the transmission connected with the traveling motor before the traveling motor displacement is changed. However, if the traveling motor displacement or the reduction gear ratio of the transmission connected with the traveling motor is increased before the traveling motor displacement is changed, a required flow rate of a traveling system for rotating the traveling motor increases during maximum speed traveling in the above state. This increases hydraulic pressure loss generated in lines of the traveling system, resulting an increase in energy loss during high-speed traveling and degradation of the fuel efficiency. To prevent this, the cross-section of a line is increased to reduce pressure loss in pipes of the traveling system. In this case, however, more piping space is required on the vehicle body resulting in an increase in size of the vehicle body.

On the other hand, the above-mentioned art described in Patent document 3 controls the displacement of the hydraulic pump when the high-horsepower operation mode is selected, or increases the maximum engine speed in relation to traveling motor displacement changeover by the self-pressure to prevent vehicle speed increase. However, hydraulic pump displacement control has a problem that the control system becomes complicated as described in PATENT DOCUMENT 1 easily resulting in cost increase. When the maximum engine speed is increased in relation to traveling motor displacement changeover by the self-pressure, the maximum engine speed is controlled and the traveling motor displacement is changed using a predetermined delivery pressure of the hydraulic pump as a threshold value. In this case, setup variation and control response delay are unavoidable. If the delivery pressure of the hydraulic pump decreases to become out of absorption torque control and accordingly the delivery rate of the hydraulic pump increases, the vehicle speed may temporarily increase resulting in an increase in the number of check points in development to compensate the temporary vehicle speed increase.

A first object of the present invention is to provide a traveling control apparatus for a hydraulic traveling vehicle, which controls the pump flow rate and motor displacement according to the traveling state to ensure favorable traveling performance without degrading the fuel efficiency.

A second object of the present invention is to provide a traveling control apparatus for a hydraulic traveling vehicle, which ensures favorable traveling performance through high horsepower while simply and securely preventing vehicle speed increase accompanying a maximum engine speed increase.

Means for Solving the Problems (1) In order to attain the above-mentioned first object, a first aspect of the present invention is a traveling control apparatus for a hydraulic traveling vehicle, comprising: a hydraulic pump driven by a prime mover; and a variable-displacement hydraulic traveling motor driven by hydraulic fluid supplied from the hydraulic pump; wherein the traveling control apparatus includes: detection means for detecting parameters regarding the traveling state of the hydraulic traveling vehicle; operating state determination means for determining the operating state of the hydraulic traveling vehicle based on the parameters regarding traveling state; and control means for controlling the maximum flow rate supplied to the hydraulic traveling motor and the equivalent displacement of the traveling system including the hydraulic traveling motor according to the result of operating state determination.

In this way, the maximum flow rate supplied to a hydraulic traveling motor and the equivalent displacement of the traveling system including a hydraulic traveling motor are controlled according to the result of operating state determination for the hydraulic traveling vehicle obtained based on parameters regarding the vehicle traveling state. If the maximum flow rate supplied to the hydraulic traveling motor and the equivalent displacement of the traveling system including a hydraulic traveling motor are preset to appropriate values, favorable traveling performance can be ensured without degrading the fuel efficiency.

For example, in a state where deceleration is required, changing the equivalent displacement of the traveling system (for example, the displacement of the hydraulic traveling motor) to a large value can ensure sufficient braking force and attain favorable operation feeling.

Further, the maximum speed cannot be ensured in the slope-descending state simply by increasing the equivalent displacement (for example, the traveling motor displacement) of the traveling system. Increasing the equivalent displacement of the traveling system, increasing the maximum flow rate supplied to the hydraulic traveling motor (maximum flow rate of the traveling system, for example, the delivery rate of the hydraulic pump), and presetting both quantities to appropriate values allow the vehicle to descend a slope at a stable speed.

Even during acceleration operation until the vehicle reaches the maximum speed, increasing the equivalent displacement of the traveling system (for example, the traveling motor displacement) reduces the drive pressure necessary for acceleration and decreases a leak flow rate from the traveling system including the hydraulic motor, thus increasing the overall efficiency and improving the acceleration feeling during acceleration operation.

In a state where neither deceleration nor acceleration is necessary, the equivalent displacement of the traveling system (for example, the traveling motor displacement) is decreased so as to be lower than the displacement normally required to reduce a flow rate necessary to maintain the speed, thus keeping down pressure loss produced in pipes of the traveling system and improving the fuel efficiency. In this case, heat generated in pressure loss also decreases and therefore a cooling device required for the vehicle body can be reduced in size.

(2) A second aspect of the present invention is the traveling control apparatus according to (1) above, wherein: for example, the control means controls the displacement of the hydraulic traveling motor to control the equivalent displacement of the traveling system including the hydraulic traveling motor.

(3) A third aspect of the present invention is the traveling control apparatus according to (1) above, further comprising a transmission provided in an output section of the hydraulic traveling motor, wherein the control means may control the equivalent displacement of the traveling system including the hydraulic traveling motor through changeover of the reduction gear ratio of the transmission.

(4) A fourth aspect of the present invention is the traveling control apparatus according to (1) above, wherein: for example, the control means controls the engine speed of the prime mover to vary the delivery rate of the hydraulic pump, thus controlling the maximum flow rate supplied to the hydraulic traveling motor.

(5) A fifth aspect of the present invention is the traveling control apparatus according to (1) above, wherein: the control means may control the maximum displacement of the hydraulic pump to vary the delivery rate of the hydraulic pump, thus controlling the maximum flow rate supplied to the hydraulic traveling motor.

(6) A sixth aspect of the present invention is the traveling control apparatus according to (1) above, further comprising a directional control valve between the hydraulic pump and the hydraulic traveling motor, wherein the control means may control the maximum flow rate supplied to the hydraulic traveling motor by means of the directional control valve.

(7) A seventh aspect of the present invention is the traveling control apparatus according to (1) above, wherein, preferably, the operating state determination means determines at least whether the traveling state is either the normal traveling state or the slope-descending state; wherein, when the traveling state is the normal traveling state, the control means controls the maximum flow rate supplied to the hydraulic traveling motor to a predetermined first flow rate, and the equivalent displacement of the traveling system including the hydraulic traveling motor to the first displacement (equivalent displacement) that can ensure a preset maximum traveling speed with the first flow rate; and wherein, when the traveling state is the slope-descending state, the control means controls the equivalent displacement of the traveling system including the hydraulic traveling motor to the second displacement larger than the first displacement, and the maximum flow rate supplied to the hydraulic traveling motor to the second flow rate that can ensure a preset maximum speed with the second displacement.

(8) An eighth aspect of the present invention is the traveling control apparatus according to (1) above, wherein, preferably, the operating state determination means determines at least whether the traveling state is either the normal traveling state or the acceleration state; wherein, when the traveling state is the normal traveling state, the control means controls the maximum flow rate supplied to the hydraulic traveling motor to the first flow rate, and the equivalent displacement of the traveling system including the hydraulic traveling motor to the first displacement; and wherein, when the traveling state is the acceleration state, the control means controls the maximum flow rate supplied to the hydraulic traveling motor to the second flow rate larger than the first flow rate, and the equivalent displacement of the traveling system including the hydraulic traveling motor to the second displacement larger than the first displacement.

(9) A ninth aspect of the present invention is the traveling control apparatus according to (1) above, wherein, preferably, the operating state determination means determines at least whether the traveling state is either the normal traveling state or the slope-ascending state; wherein, when the traveling state is the normal traveling state, the control means controls the maximum flow rate supplied to the hydraulic traveling motor to the first flow rate, and the equivalent displacement of the traveling system including the hydraulic traveling motor to the first displacement; and wherein, when the traveling state is the slope-ascending state, the control means controls the maximum flow rate supplied to the hydraulic traveling motor to the second flow rate larger than the first flow rate, and the equivalent displacement of the traveling system including the hydraulic traveling motor to the second displacement larger than the first displacement.

(10) A tenth aspect of the present invention is the traveling control apparatus according to any one of (7) to (9), wherein, preferably, the operating state determination means determines whether or not the traveling state is the deceleration state further; and wherein, when the traveling state is the deceleration state, the control means controls the maximum flow rate supplied to the hydraulic traveling motor to the first flow rate, and the equivalent displacement of the traveling system including the hydraulic traveling motor to the second displacement.

(11) In order to attain the above-mentioned second object, an eleventh aspect of the present invention is the traveling control apparatus according to (1) above, wherein, the control means includes: first control means for varying the maximum engine speed of the prime mover according to the result of operating state determination to control the maximum delivery rate of the hydraulic pump at least between the first and second flow rates, the second flow rate being larger than the first flow rate; and second control means for controlling the equivalent displacement of the traveling system including the hydraulic traveling motor at least between the first and second displacements, the second displacement being larger than the first displacement, according to the result of operating state determination; and wherein the second flow rate of the hydraulic pump and the second displacement of the traveling system are set so that a flow rate necessary for the vehicle to travel at a preset maximum speed when the equivalent displacement of the traveling system including the hydraulic traveling motor is controlled to the second displacement agrees with the second flow rate of the hydraulic pump.

In this way, the control means varies the maximum engine speed of the prime mover to control the maximum delivery rate of the hydraulic pump between the first and second flow rates and controls the equivalent displacement of the traveling system including a hydraulic traveling motor. Further, the second flow rate of the hydraulic pump and the second displacement of the traveling system are set so that a flow rate necessary for the vehicle to travel at a preset maximum speed when the equivalent displacement of the traveling system including a hydraulic traveling motor is controlled to the second displacement agrees with the second flow rate of the hydraulic pump. Thus easily and securely preventing vehicle speed increase accompanying a maximum engine speed increase.

Further, the maximum engine speed of the prime mover is varied to control the maximum delivery rate of the hydraulic pump, and the equivalent displacement of the traveling system including a hydraulic traveling motor is controlled, thereby ensuring favorable traveling performance through high horsepower.

For example, in an operating state where high output is not necessary, the equivalent displacement of the traveling system (for example, the traveling motor displacement) is controlled to the first displacement smaller than the second displacement to reduce the flow rate of the traveling system necessary for traveling at a preset maximum speed, thus keeping down the pressure loss produced in pipes of the traveling system and improving the fuel efficiency.

When the equivalent displacement of the traveling system (for example, the traveling motor displacement) is increased to the second displacement, a drive pressure necessary for the acceleration state, slope-ascending state, and other states requiring tractional force decreases, resulting in a reduced leak flow rate from the traveling system including a hydraulic motor, an increased overall efficiency during acceleration and slope-ascending operations, and improved acceleration feeling.

(12) A twelfth aspect of the present invention is the traveling control apparatus according to (11) above, wherein: preferably, the first flow rate of the hydraulic pump and the first displacement of the traveling system are set so that a flow rate necessary for the vehicle to travel at the preset maximum speed when the equivalent displacement of the traveling system including the hydraulic traveling motor is controlled to the first displacement agrees with the first flow rate of the hydraulic pump.

(13) A thirteenth aspect of the present invention is the traveling control apparatus according to (11) or (12) above, wherein: for example, the second control means controls the displacement of the hydraulic traveling motor to control the equivalent displacement of the traveling system including the hydraulic traveling motor.

(14) A fourteenth aspect of the present invention is the traveling control apparatus according to (11) or (12) above, further comprising a transmission provided at an output section of the hydraulic traveling motor, wherein the second control means may control the equivalent displacement of the traveling system including the hydraulic traveling motor through changeover of the reduction gear ratio of the transmission.

(15) A fifteenth aspect of the present invention is the traveling control apparatus according to (11) or (12) above, wherein the operating state determination means determines at least whether the traveling state is either the normal traveling state or the slope-descending state; wherein, when the traveling state is the normal traveling state, the first and second control means control the delivery rate of the hydraulic pump to the first flow rate and the equivalent displacement of the traveling system including the hydraulic traveling motor to the first displacement; and wherein, when the traveling state is the slope-descending state, the first and second control means control the delivery rate of the hydraulic pump to the second flow rate and the equivalent displacement of the traveling system including the hydraulic traveling motor to the second displacement.

(16) A sixteenth aspect of the present invention is the traveling control apparatus according to (11) or (12) above, wherein the operating state determination means determines at least whether the traveling state is either the normal traveling state or the acceleration state; wherein, when the traveling state is the normal traveling state, the first and second control means control the delivery rate of the hydraulic pump to the first flow rate and the equivalent displacement of the traveling system including the hydraulic traveling motor to the first displacement; and wherein, when the traveling state is the acceleration state, the first and second control means control the delivery rate of the hydraulic pump to the second flow rate and the equivalent displacement of the traveling system including the hydraulic traveling motor to the second displacement.

(17) A seventeenth aspect of the present invention is the traveling control apparatus according to (11) or (12) above, wherein the operating state determination means determines at least whether the traveling state is either the normal traveling state or the slope-ascending state; wherein, when the traveling state is the normal traveling state, the first and second control means control the delivery rate of the hydraulic pump to the first flow rate and the equivalent displacement of the traveling system including the hydraulic traveling motor to the first displacement; and wherein, when the traveling state is the slope-ascending state, the first and second control means control the delivery rate of the hydraulic pump to the second flow rate and the equivalent displacement of the traveling system including the hydraulic traveling motor to the second displacement.

(18) An eighteenth aspect of the present invention is the traveling control apparatus according to any one of (15) to (17) above, wherein the operating state determination means determines at least whether or not the traveling state is the deceleration state; and wherein, when the traveling state is the deceleration state, the first and second control means control the delivery rate of the hydraulic pump to the first flow rate and the equivalent displacement of the traveling system including the hydraulic traveling motor to the second displacement.

(19) A nineteenth aspect of the present invention is the traveling control apparatus according to any one of (1) to (18) above, wherein: the detection means detects at least a traveling speed of the hydraulic traveling vehicle, a traveling operation command for driving the hydraulic traveling motor, and the delivery pressure of the hydraulic pump as parameters regarding the traveling state of the hydraulic traveling vehicle.

Effect of the Invention

In accordance with the present invention, the maximum flow rate supplied to a hydraulic traveling motor and the equivalent displacement of the traveling system including a hydraulic traveling motor are controlled according to the result of operating state determination for the hydraulic traveling vehicle obtained based on parameters regarding the traveling state, thereby ensuring favorable traveling performance without degrading the fuel efficiency.

In accordance with the present invention, the maximum engine speed of the prime mover is varied to control the maximum delivery rate of a hydraulic pump between the first and second flow rates, and the equivalent displacement of the traveling system including a hydraulic traveling motor is controlled. Further, the second flow rate of a hydraulic pump and the second displacement of the traveling system are set so that a flow rate necessary for the vehicle to travel at a preset maximum speed when the equivalent displacement of the traveling system including a hydraulic traveling motor is controlled to the second displacement agrees with the second flow rate of the hydraulic pump, thereby ensuring favorable traveling performance through high horsepower while simply and securely preventing vehicle speed increase accompanying a maximum engine speed increase.

BRIEF DESCRIPTION OF THE DRAWINGS

FIG. 5 is a table showing detailed determination and selection processing in Steps S120 and S130 of FIG. 4.

DESCRIPTION OF NUMERALS

| | |
|---|---|
| 1 | Engine (prime mover) |
| 10 | Hydraulic pump |
| 11 | Pump regulator |
| 12 | Travel control valve (directional control valve) |
| 14 | Hydraulic traveling motor |
| 15 | Transmission |
| 16 | Pilot hydraulic fluid source |
| 20 | Travel pilot control circuit |
| 21 | Accelerator pedal |
| 22a, 22b | Travel pilot valve |
| 23a, 23b | Pilot line |
| 30 | Travel drive circuit |
| 31a, 31b | Main line |
| 32 | Counter balance valve |
| 33 | Motor regulator |
| 34a, 34b | Crossover load relief valve |
| 35 | Shuttle valve |
| 36 | Valve unit |
| 37a, 37b | Restrictor |
| 38a, 38b | Check valve |
| 40 | Transmission control system |
| 41 | Power supply |
| 42 | Speed selector switch |
| 43 | Solenoid valve |
| 51 | Hydraulic cylinder |
| 52 | Servo valve |
| 52a, 52b | First and second pressure receivers |
| 52c, 52d | First and second springs |
| 52s | Servo valve spool |
| 53 | Operating rod |
| 54a, 54b | First control line |
| 55 | Line |
| 71 | Rotational speed pickup (traveling speed detection means) |
| 72 | Hydraulic pressure sensor (traveling operation detection means) |
| 73 | Hydraulic pressure sensor (drive status detection means) |
| 74 | Voltage sensor (transmission shift position detection means) |
| 75 | Engine control dial |
| 76 | Hydraulic pressure sensor (travel loading pressure detection means) |
| 77 | Travel/work selector switch |
| 80 | Control unit |
| 81 | Solenoid proportional valve |
| 82 | Engine control system |
| 83 | Signal line |
| 90 | Travel target-engine speed calculation unit |
| 91 | Work target-engine speed calculation unit |
| 92 | Reference target-engine speed calculation unit |
| 93 | Target vehicle speed calculation unit |
| 94 | Vehicle speed deviation calculation unit |
| 95 | Acceleration engine speed-increment calculation unit |
| 96 | Acceleration target-engine speed compensation unit |
| 97 | Switching unit |
| 98 | Maximum value selection unit |
| 99 | Target engine speed compensation unit |

BEST MODE FOR CARRYING OUT THE INVENTION

Embodiments of the present invention will be explained below with reference to the accompanying drawings.

Figure 1:
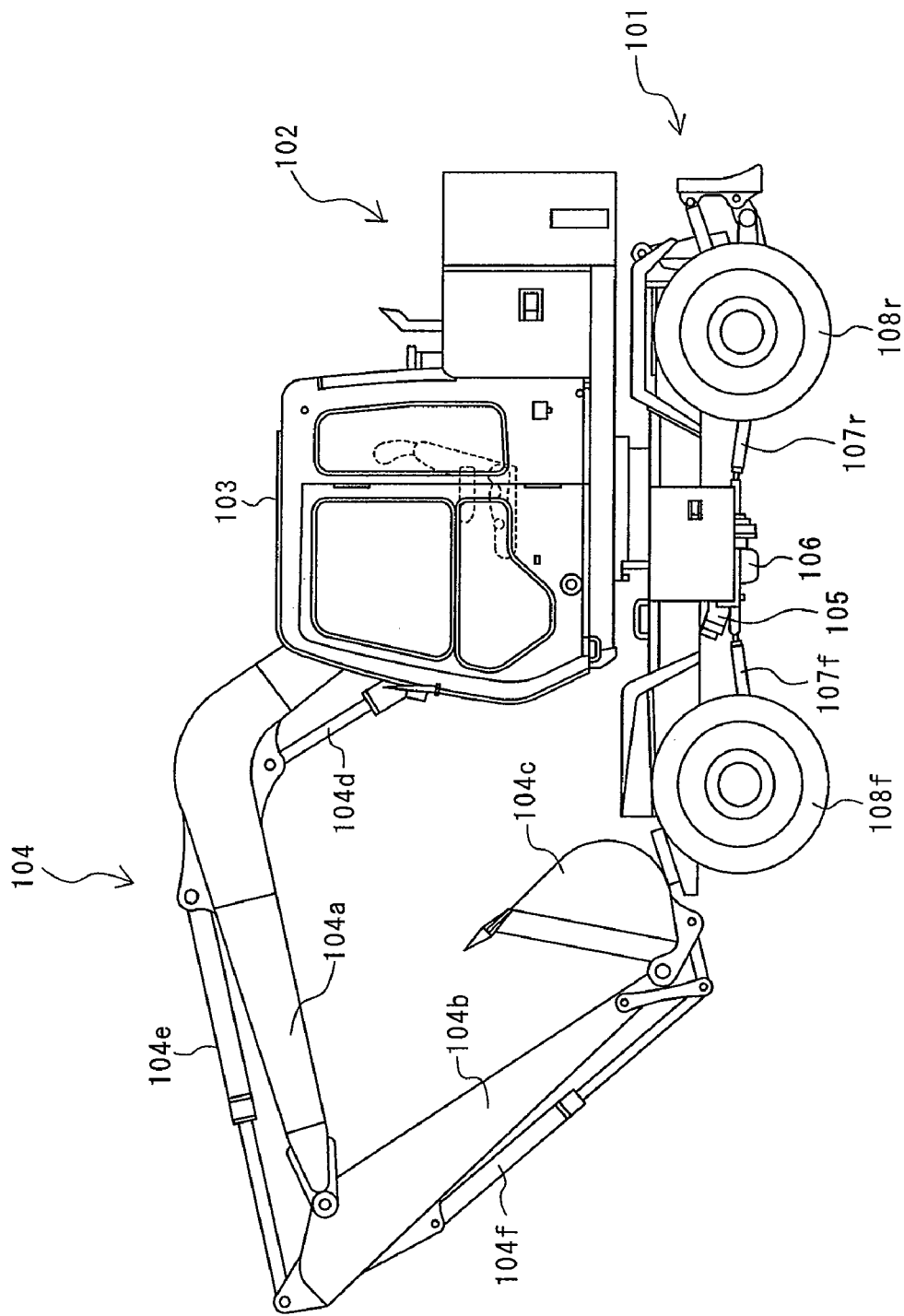
FIG. 1 shows a wheel-mounted hydraulic excavator according to the present invention.

FIG. 1 shows a wheel-mounted hydraulic excavator according to the present invention. The wheel-mounted hydraulic excavator comprises a lower travel structure 101 and an upper swing structure 102 pivotably mounted on the top of the lower travel structure 101. The upper swing structure 102 mounts a cab 103 and a front work attachment 104. The front attachment 104 includes a boom 104a vertically pivotably connected with the main unit of the upper swing structure 102, an arm 104b vertically and longitudinally pivotably connected with the boom 104a, and a bucket 104c vertically and longitudinally pivotably connected with the arm 104b. The boom 104a is driven by a boom cylinder 104d. The arm 104b is driven by an arm cylinder 104e. The bucket 104c is driven by a bucket cylinder 104f. The lower travel structure 101 includes a hydraulic traveling motor 105, a transmission 106, and propeller shafts 107f and 107r. Front tires 108f and rear tires 108r are driven by the propeller shafts 107f and 107r, respectively.

Figure 2:
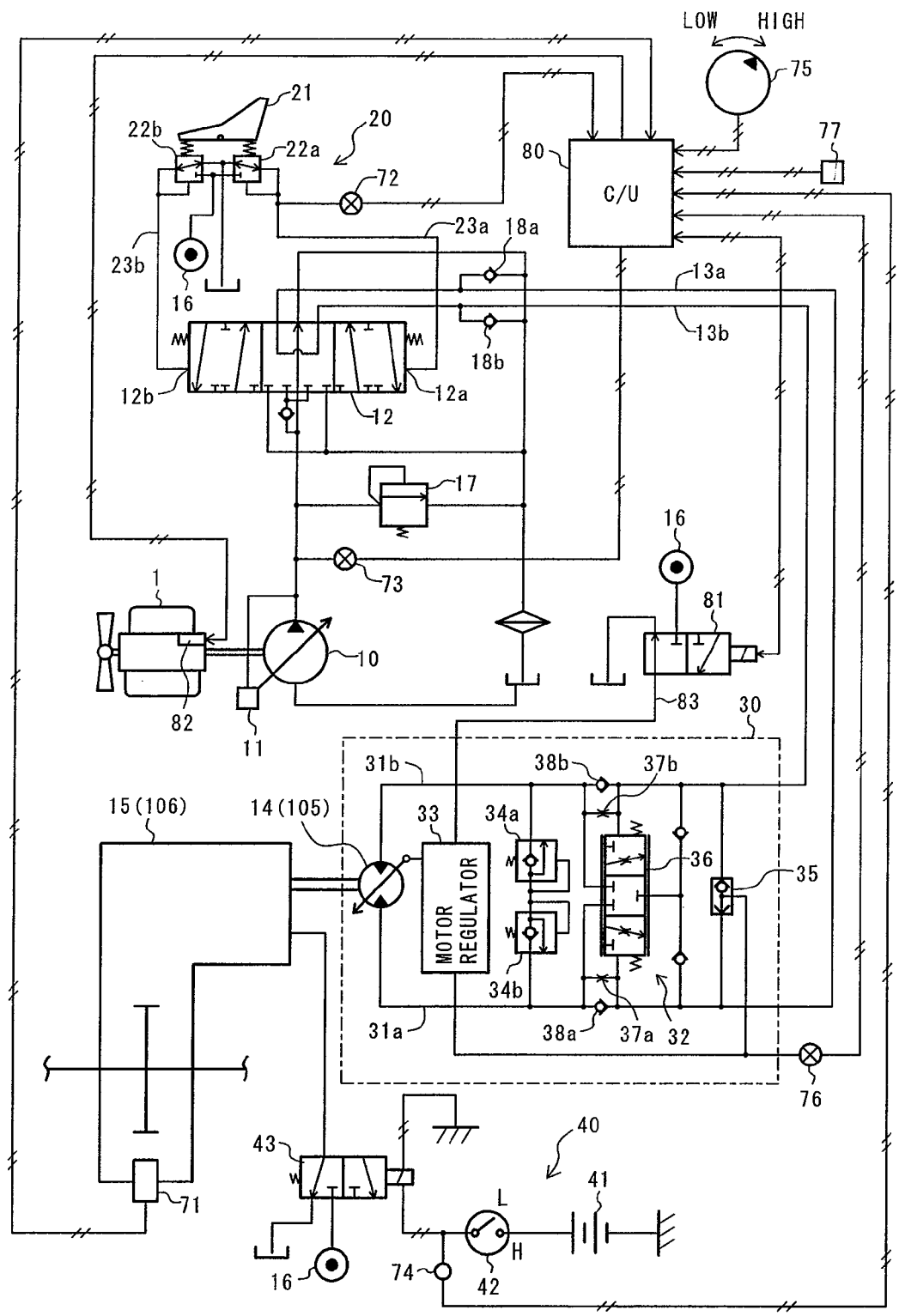
FIG. 2 is a general block diagram of a traveling control apparatus according to a first embodiment of the present invention.

FIG. 2 is a general block diagram of a traveling control apparatus according to a first embodiment of the present invention. The traveling control apparatus comprises: a prime mover that is a diesel engine (hereinafter simply referred to as engine) 1; a hydraulic pump 10 driven with the engine 1; a pump regulator 11 for controlling the volume (displacement volume) of the hydraulic pump 10; a travel control valve (directional control valve) 12 for controlling the flow rate and direction of delivered fluid of the hydraulic pump 10; a travel pilot control circuit 20 for generating a traveling command pressure for operating the travel control valve 12; a travel drive circuit 30 including the variable-displacement hydraulic traveling motor 14 (equivalent to the hydraulic traveling motor 105 of FIG. 1) driven by hydraulic fluid controlled by the travel control valve 12, the travel drive circuit being connected to the travel control valve 12 through a pair of actuator lines 13a and 13b; a transmission 15 (equivalent to the transmission 106 of FIG. 1) that can switch between high-speed and low-speed shift positions through operation of a hydraulic cylinder (not shown), the transmission being connected with an output shaft of the hydraulic traveling motor 14; a transmission control system 40 for selectively leading the hydraulic fluid of the pilot hydraulic fluid source 16 to the hydraulic cylinder of the transmission 15 and selecting high-speed or low-speed shift position of the transmission 15; and a main relief valve 17 for restricting the maximum delivery pressure of the hydraulic pump 10.

Figure 11:
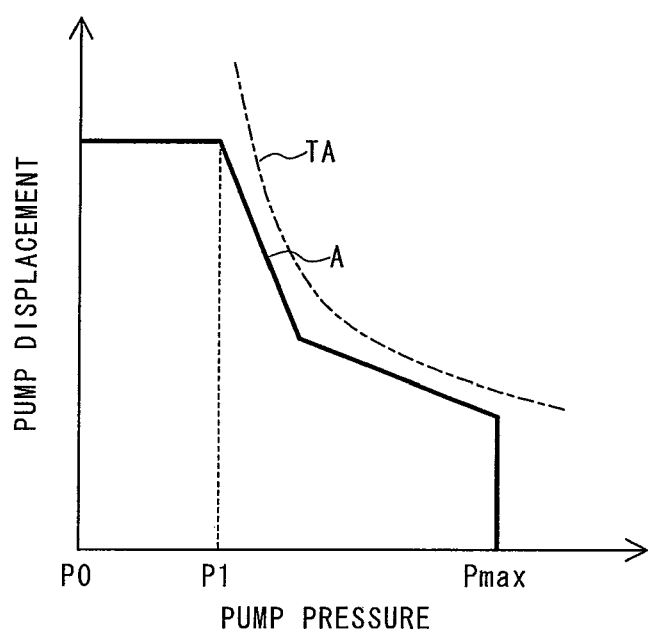
FIG. 11 is a graph showing torque control characteristics of a pump regulator.
Figure 12:
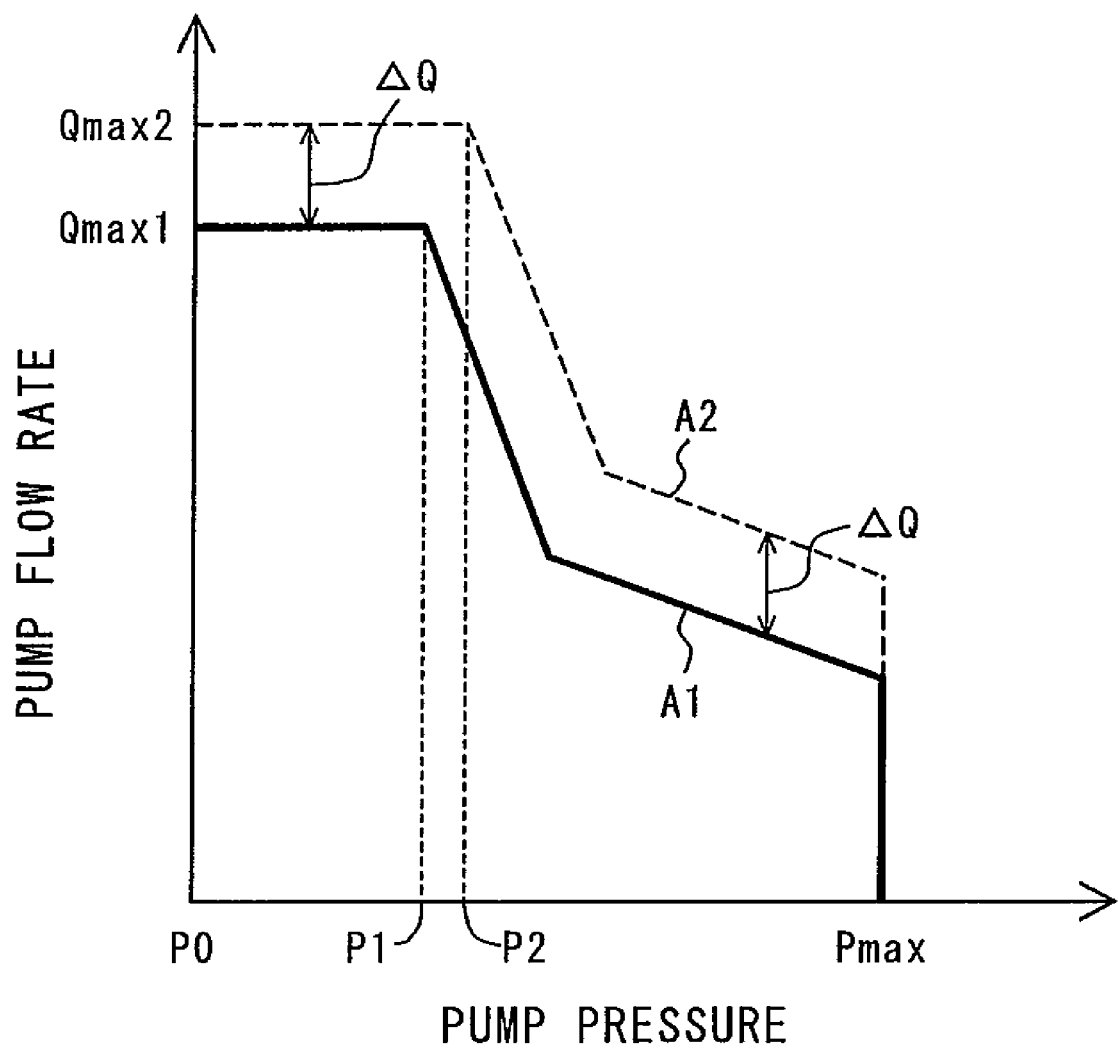
FIG. 12 is a PQ diagram showing a relation between a pump pressure and a pump flow rate obtained from limited control of the hydraulic pump displacement by the pump regulator.

The pump regulator 11 controls the displacement of the hydraulic pump 10 so that the absorption torque of the hydraulic pump 10 does not exceed a preset maximum torque to control the delivery rate of the hydraulic pump 10 and control the maximum horsepower of the hydraulic pump 10 (FIGS. 11 and 12).

The travel pilot control circuit 20 includes travel pilot valves 22a and 22b for generating a forward or reverse traveling command pressure according to the amount of depression (operation amount) and the depression direction of an accelerator pedal 21. The forward traveling command pressure is led to a forward travel side pressure receiver 12a of the travel control valve 12 through a pilot line 23a to stroke the travel control valve 12 to the left of FIG. 2. The reverse traveling command pressure is led to a forward travel side pressure receiver 12b of the travel control valve 12 through a pilot line 23b to stroke the travel control valve 12 to the right of FIG. 2.

The travel drive circuit 30 includes: main lines 31a and 31b for connecting the hydraulic traveling motor 14 to the travel control valve 12 through the actuator lines 13a and 13b; a counter balance valve 32 interposed between the travel control valve 12 and the hydraulic traveling motors 14; a motor regulator 33 for controlling the volume (displacement volume) of the hydraulic traveling motor 14; crossover load relief valves 34a and 34b for regulating the maximum pressure of the actuator lines 13a and 13b and the main lines 31a and 31b; and a shuttle valve 35 for selectively taking out the pressure on the high-pressure side of the actuator lines 13a and 13b. Check valves 18a and 18b for supply are provided in the actuator lines 13a and 13b.

The counter balance valve 32, also referred to as brake valve, includes a valve unit 36 having a neutral position and left and right opening positions; and restrictors 37a and 37b and check valves 38a and 38b respectively provided in parallel with each other in the valve unit 36. In the slope-descending state or other operating states where the hydraulic traveling motor 14 performs a pump action, a discharge port of the valve unit 36 closes to generate a back pressure (brake pressure) in the main line 31b (delivery side of the hydraulic traveling motor 14) by actions of the restrictor 37a and the over-load relief valve 34a.

The transmission control system 40 includes: a power supply 41; a speed selector switch 42; and a solenoid valve 43 adapted to be excited when the speed selector switch 42 set to a position L (open), i.e., the position shown in FIG. 2, is operated and changed to a position H (closed). When the solenoid valve 43 is positioned as shown in FIG. 2, the hydraulic cylinder for gearshift (not shown) in the transmission 15 is connected to a tank, and the transmission 15 is switched to the high-speed shift position. When the speed selector switch 42 is operated and the solenoid valve 43 changed from the position shown in FIG. 2, the hydraulic fluid of the pilot hydraulic fluid source 16 is sent to the hydraulic cylinder for gearshift in the transmission 15, and the transmission 15 is switched to the low-speed shift position.

The traveling control apparatus according to the present embodiment comprises: a rotational speed pickup 71 as traveling speed detection means for detecting the rotational speed of an output gear of the transmission 15, the engine speed pickup being attached to the transmission 15; a hydraulic pressure sensor 72 as traveling operation detection means for detecting the forward traveling command pressure, the hydraulic pressure sensor being provided in the forward travel side pilot line 23a of the travel pilot control circuit 20; a hydraulic pressure sensor 73 as drive status detection means for detecting the delivery pressure of the hydraulic pump 10; a voltage sensor 74 as transmission shift position detection means for detecting a signal of the low-speed gear selector switch 42, the voltage sensor being connected between a low-speed gear selector switch 42b and the solenoid valve 43 of the transmission control system 40; an engine control dial 75; a hydraulic pressure sensor 76 for detecting the pressure on the high-pressure side taken out from the shuttle valve 35; a travel/work selector switch 77 for switching between the travel and work positions; a control unit 80 for inputting signals of the rotational speed pickup 71, the hydraulic pressure sensor 72, the hydraulic pressure sensor 73, the voltage sensor 74, the engine control dial 75, the hydraulic pressure sensor 76, and travel/work selector switch 77 to perform predetermined calculation processing; a solenoid proportional valve 81 driven by a signal output from the control unit 80; and an engine control system 82 for controlling the amount of fuel injection of an engine 1 based on a signal output from the control unit 80.

The solenoid proportional valve 81 generates a control pressure according to an output signal of the control unit 80 based on hydraulic fluid of the pilot hydraulic fluid source 16, and outputs the control pressure to the motor regulator 33 as an external signal through a signal line 83.

Figure 3:
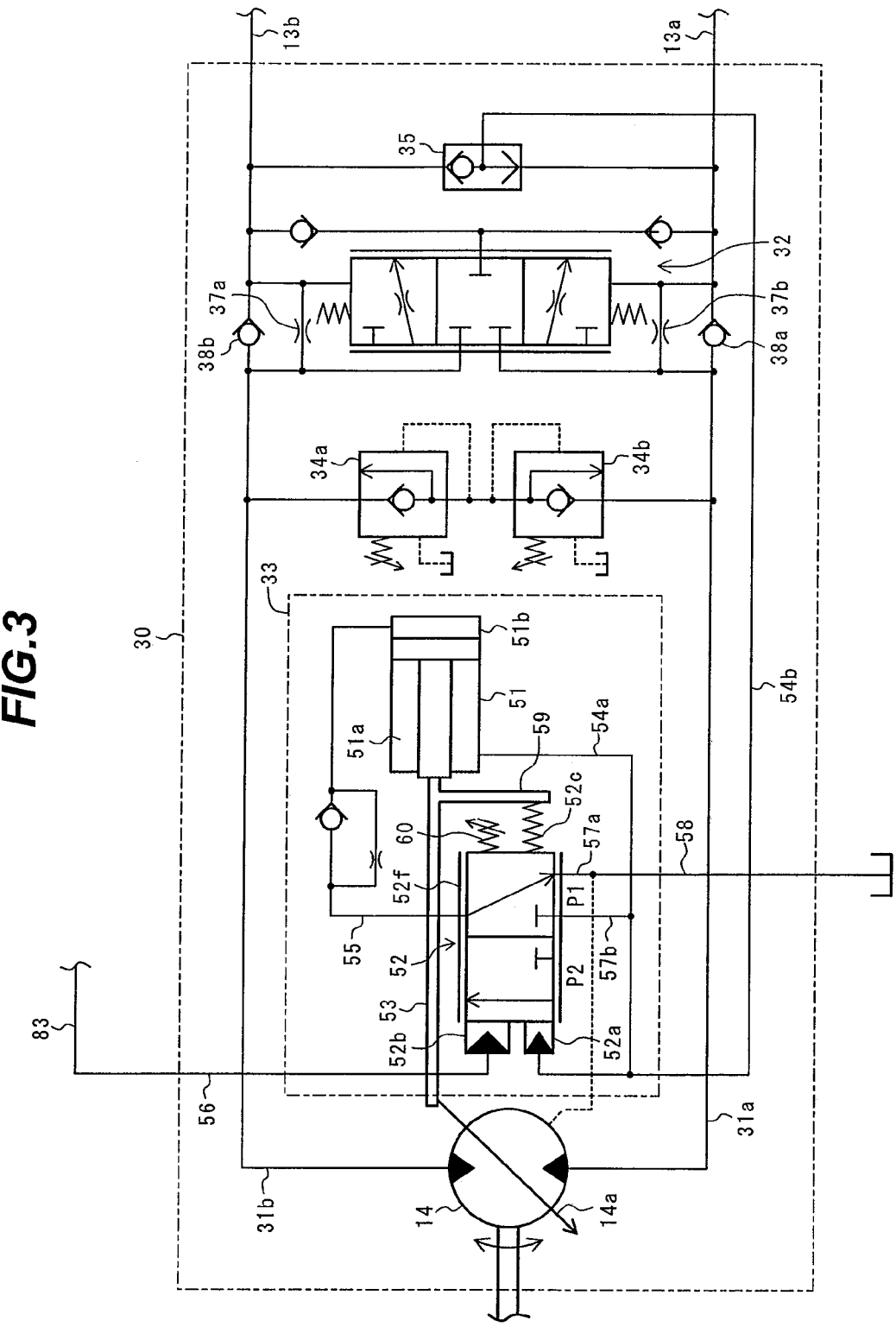
FIG. 3 is an enlarged view of a travel drive circuit showing details of a motor regulator shown in FIG. 2.

FIG. 3 is an enlarged view of the travel drive circuit 30 showing details of the motor regulator 33.

The motor regulator 33 includes: a hydraulic cylinder 51 as a control piston; a servo valve 52; and an operating rod 53 for operably connecting a piston rod of the hydraulic cylinder 51 with a swash plate 14a of the hydraulic traveling motor 14. The piston rod of the hydraulic cylinder 51 is reciprocated to move the operating rod 53 to drive the swash plate 14a of the hydraulic traveling motor 14, thus controlling the displacement of the hydraulic traveling motor 14. A rod chamber 51a of the hydraulic cylinder 51 is connected to the shuttle valve 35 for selecting the pressure on the high-pressure side of the actuator lines 13a and 13b through the first control lines 54a and 54b. A bottom chamber 51b of the hydraulic cylinder 51 is connected to the servo valve 52 through a line 55.

The servo valve 52 includes first and second pressure receivers 52a and 52b for biasing a servo valve spool 52s to the right of FIG. 3; and first and second springs 52c and 52d for biasing the servo valve spool 52s to the left of FIG. 3. The pressure (travel loading pressure) of the first control lines 54a and 54b is led to the first pressure receiver 52a, and the pressure (external signal) of a second control line 56 to the second pressure receiver 52b.

When the servo valve spool 52s of the servo valve 52 is positioned at a position P1 of FIG. 3, the bottom chamber 51b of the hydraulic cylinder 51 communicates with a drain circuit 58 of the hydraulic traveling motor 14 through the line 55, the servo valve 52, and a line 57a. The pressure in the bottom chamber 51b serves as tank pressure. In this case, the hydraulic cylinder 51 contracts as shown in FIG. 3 by the hydraulic fluid pressure on the rod side 51a to control the hydraulic traveling motor 14 to the minimum displacement.

When servo valve spool 52s of the servo valve 52 moves to a position P2 on the left-hand side of FIG. 3, the bottom chamber 51b of the hydraulic cylinder 51 communicates with the shuttle valve 35 through the line 55, the servo valve 52, a line 57b, and first control lines 54a and 54b. The pressure in the bottom chamber 51b serves as the travel loading pressure taken out from the shuttle valve 35. Accordingly, the hydraulic cylinder 51 maximally elongates to move the operating rod 53 to the left of FIG. 3, thus controlling the hydraulic traveling motor 14 to the maximum displacement.

When the servo valve spool 52s of the servo valve 52 is positioned between the positions P1 and P2, the bottom chamber 51b of the hydraulic cylinder 51 communicates with both lines 57a and 57b through the line 55 and the servo valve 52. The pressure in the bottom chamber 51b serves as an intermediate pressure between the tank pressure and the travel loading pressure. Accordingly, the hydraulic cylinder 51 elongates to an intermediate position to move the operating rod 53 to the left of FIG. 3, thus controlling the hydraulic traveling motor 14 to an intermediate displacement.

The position of the servo valve spool 52s of the servo valve 52 is controlled by actions of a feedback rod 59 provided on the operating rod 53, a first spring 52c, and a second spring 52d, according to the pressure (travel loading pressure) of the first control lines 54a and 54b led to the first pressure receiver 52a and the pressure (external signal) of the second control line 56 led to the second pressure receiver 52b, thus controlling the displacement of the hydraulic traveling motor 14.

When the minimum displacement of the hydraulic traveling motor 14 is defined as "Small", the maximum displacement thereof as "Large", and an intermediate displacement between the maximum and minimum displacements "Middle", the travel loading pressure led to the first pressure receiver 52a can control the displacement of the hydraulic traveling motor 14 to the entire range including "Small", "Middle", and "Large" through operation of the servo valve 52, and the pressure (external signal) of the second control line 56 led to the second pressure receiver 52b can control the displacement of the hydraulic traveling motor 14 to "Small" (first displacement) or "Middle" (second displacement) through operation of the servo valve 52. Further, the pressure receiving area of the first pressure receiver 52a and that of the second pressure receiver 52b have a predetermined difference from each other (pressure receiving area of the first pressure receiver 52a is smaller than that of the second pressure receiver 52b), each having different control characteristics. The displacement of the hydraulic traveling motor 14 is controlled either by the displacement indicated by the pressure (travel loading pressure) of the first control lines 54a and 54b led to the first pressure receiver 52a or the displacement indicated by the pressure (external signal) of the second control line 56 led to the second pressure receiver 52b, whichever larger.

Processing functions of the control unit 80 will be explained below.

Figure 4:
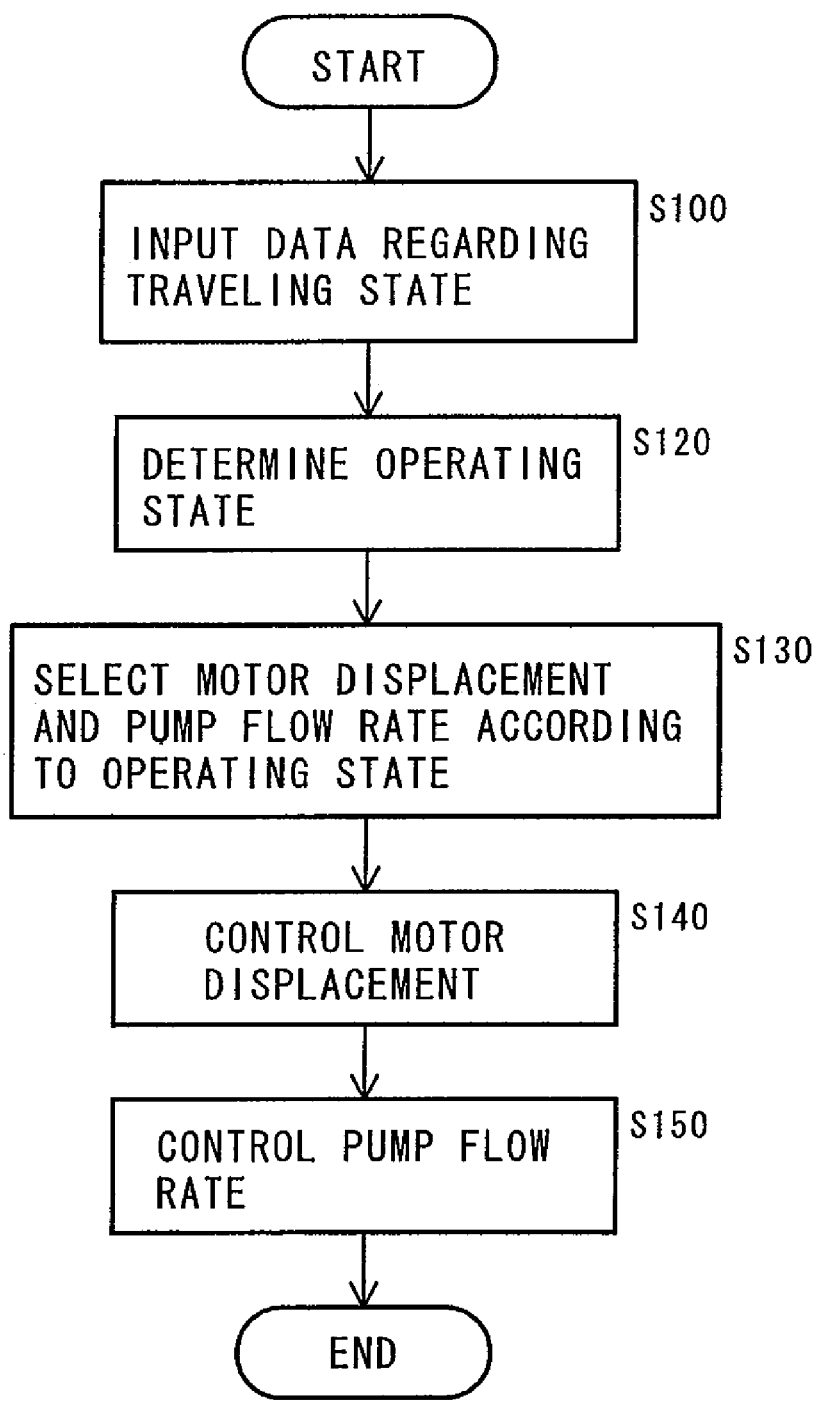
FIG. 4 is a flowchart showing the overview of processing functions of a motor displacement/pump flow rate control and calculation unit out of processing functions of a control unit.

FIG. 4 is a flowchart showing the overview of processing functions of a motor displacement/pump flow rate control and calculation unit out of functions of the control unit 80. First, the control unit 80 inputs various pieces of data (parameters) regarding the traveling state of a wheel-mounted hydraulic excavator (Step S100). Pieces of data (parameters) regarding the traveling state include the rotational speed of the output gear of the transmission 15 detected by the rotational speed pickup 71, the forward traveling command pressure detected by the hydraulic pressure sensor 72, the delivery pressure (hereinafter occasionally referred to as pump pressure) of the hydraulic pump 10 detected by the hydraulic pressure sensor 73, the command signal (hereinafter occasionally referred to as transmission shift position) of the low-speed gear selector switch 42 detected by the voltage sensor 74, and the travel loading pressure detected by the hydraulic pressure sensor 76. The rotational speed of the output gear of the transmission 15 detected by the rotational speed pickup 71 is converted to the traveling speed of the wheel-mounted hydraulic excavator and used as the traveling speed.

Subsequently, the control unit 80 determines the operating state of the wheel-mounted hydraulic excavator by use of various pieces of data (parameters) regarding the traveling state (Step S120), and selects a required displacement (motor displacement) of the hydraulic traveling motor 14 and a required flow rate (pump flow rate) of the hydraulic pump 10 based on the operating state (Step S130).

FIG. 5 is a table showing detailed determination and selection processing in Steps S120 and S130. Steps S120 and S130 determine the operating state and select the motor displacement and pump flow rate as shown below.

<First Traveling State>

| Traveling speed (km/h) | Not care |
|---|---|
| Traveling command pressure | >2/3 of maximum command pressure Ptmax |
| Pump pressure (Mpa) | >20 |
| Transmission shift position | Not care |

In this case, the control unit determines the current traveling state as the acceleration state and selects the motor displacement and pump flow rate as follows:

| Motor displacement | Middle (second displacement) |
|---|---|
| Pump flow rate | Large (second flow rate) |

<Second Traveling State>

| Traveling speed (km/h) | >10 |
|---|---|
| Traveling command pressure | >2/3 of maximum command pressure Ptmax |
| Pump pressure (Mpa) | >25 |
| Transmission shift position | Not care |

In this case, the control unit determines the current traveling state as the slope-ascending state and selects the motor displacement and pump flow rate as follows:

| Motor displacement | Middle (second displacement) |
|---|---|
| Pump flow rate | Large (second flow rate) |

<Third Traveling State>

| Traveling speed (km/h) | >10 |
|---|---|
| Traveling command pressure | <1/3 of maximum command pressure Ptmax |
| Pump pressure (Mpa) | Not care |
| Transmission shift position | Hi |

In this case, the control unit determines the current traveling state as the deceleration state and selects the motor displacement and pump flow rate as follows:

| Motor displacement | Middle (second displacement) |
|---|---|
| Pump flow rate | Small (first flow rate) |

<Fourth Traveling State>

| Traveling speed (km/h) | >10 |
|---|---|
| Traveling command pressure | >2/3 of maximum command pressure Ptmax |
| Pump pressure (Mpa) | <3 |
| Transmission shift position | Hi |

In this case, the control unit determines the current traveling state as the slope-descending state and selects the motor displacement and pump flow rate as follows:

| | |
|---|---|
| Motor displacement | Middle (second displacement) |
| Pump flow rate | Large (second flow rate) |

<Fifth Traveling State>
State Other than the Above States

In this case, the control unit determines the current traveling state as an operating state other than the acceleration, slope-ascending, deceleration, and slope-descending states, and selects the motor displacement and pump flow rate as follows:

| | |
|---|---|
| Motor displacement | Small (first displacement) |
| Pump flow rate | Small (first flow rate) |

Returning to FIG. 4, the control unit 80 controls the hydraulic traveling motor 14 to obtain a required flow rate (Step S140) and the hydraulic pump 10 to obtain a required flow rate (Step S150).

Figure 6:
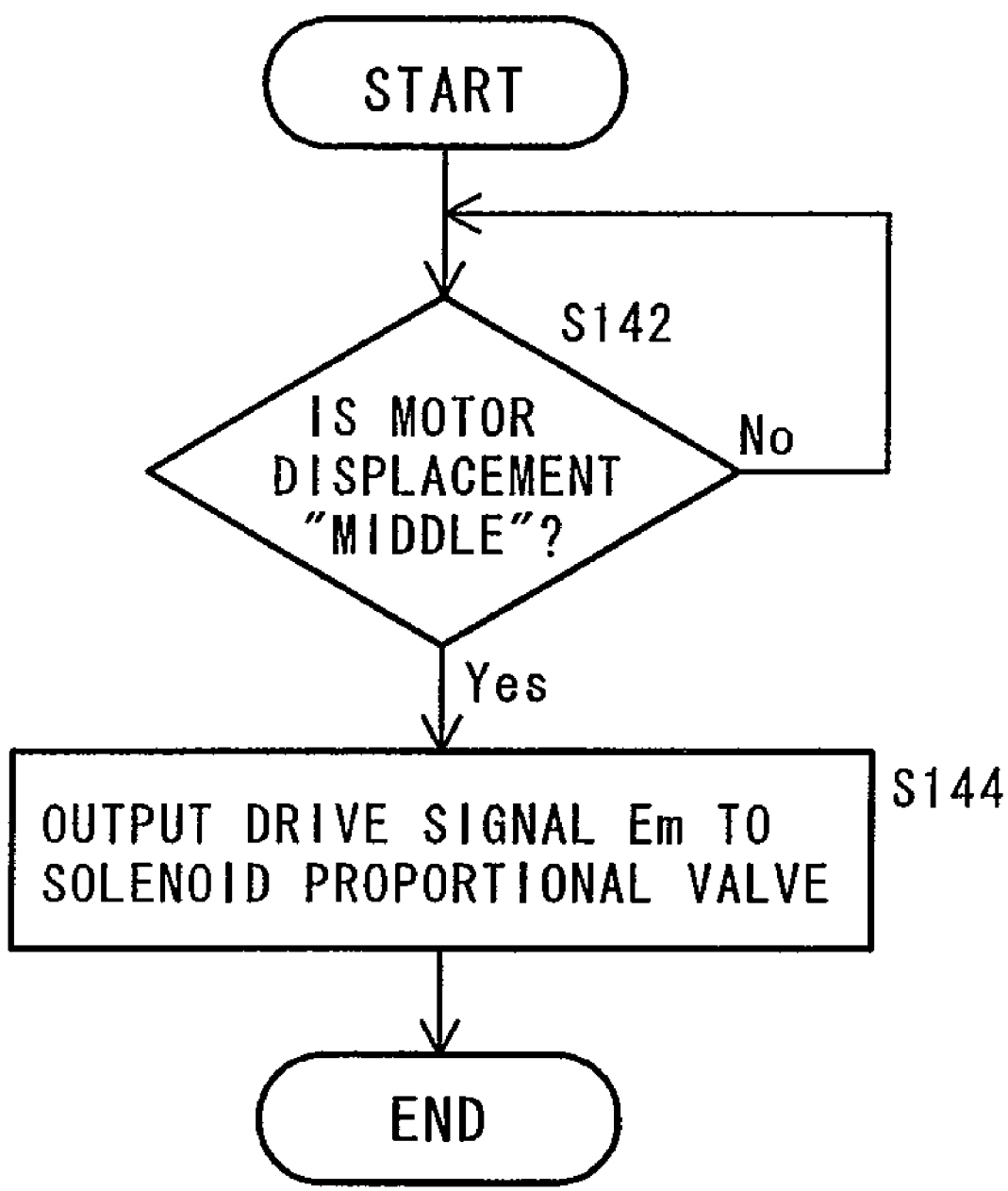
FIG. 6 is a flowchart showing detailed control processing of a hydraulic motor in Step S140 of FIG. 4.

FIG. 6 is a flowchart showing detailed control processing of the hydraulic traveling motor 14 in Step S140. The control unit 80 determines whether or not the required displacement of the hydraulic traveling motor 14 selected in Step S130 is "Middle" (Step S142), and, if the result of determination is not "Middle", performs no operation and repeats the same determination processing. In this case, the solenoid proportional valve 81 is set to the OFF position of FIG. 2, and the tank pressure is led to the second pressure receiver 52b of the servo valve 52 of the motor regulator 33 as an external signal. When the travel loading pressure detected by the shuttle valve 35 and applied to the second pressure receiver 52a is lower than the pressure corresponding to the small motor displacement, the servo valve 52 operates at the position P1 of FIG. 3 to set the hydraulic traveling motor 14 to the "Small" displacement. When the required displacement of the hydraulic traveling motor 14 selected in Step S130 is "Middle", the control unit 80 calculates a target value of the control pressure (external signal), output from the solenoid proportional valve 81, necessary to control the displacement of the hydraulic traveling motor 14 to "Middle"; and outputs a drive signal (motor displacement command signal: voltage signal) Em associated with the target value (Step S144).

Here, as mentioned above, the first and second pressure receivers 52a and 52b of the servo valve 52 have different control characteristics in relation to the respective pressure receiving area. The travel loading pressure is led to the first pressure receiver 52a to control the servo valve spool 52s of the servo valve 52. In calculation of a target value of the control pressure (external signal) output from the solenoid proportional valve 81, the control unit 80 obtains a target value of the control pressure in order to correct the travel loading pressure in the first pressure receiver 52a, as shown below.

$$Po=Pt+Pc, \text{ i.e., } Pc=Po-Pt$$

where Pc denotes the target value of the control pressure, Po denotes a control pressure necessary to obtain a target displacement "Middle" only with the control signal output from the solenoid proportional valve 81, and Pt denotes a conversion value to the control pressure of the travel loading pressure.

(1) Here, Po is a precalculated value, and Pt can be calculated from the travel loading pressure detected by the hydraulic pressure sensor 35.

The solenoid proportional valve 81 generates a control pressure equivalent to Pc with the drive signal Em associated with the thus-obtained target value of the control pressure. The control pressure is led to the second pressure receiver 52b of the servo valve 52 of the motor regulator 33 as an external signal. Accordingly, the servo valve 52 operates from the position P1 (shown in FIG. 3) to the position P2 to switch the hydraulic traveling motor 14 to the Middle displacement.

Figure 7:
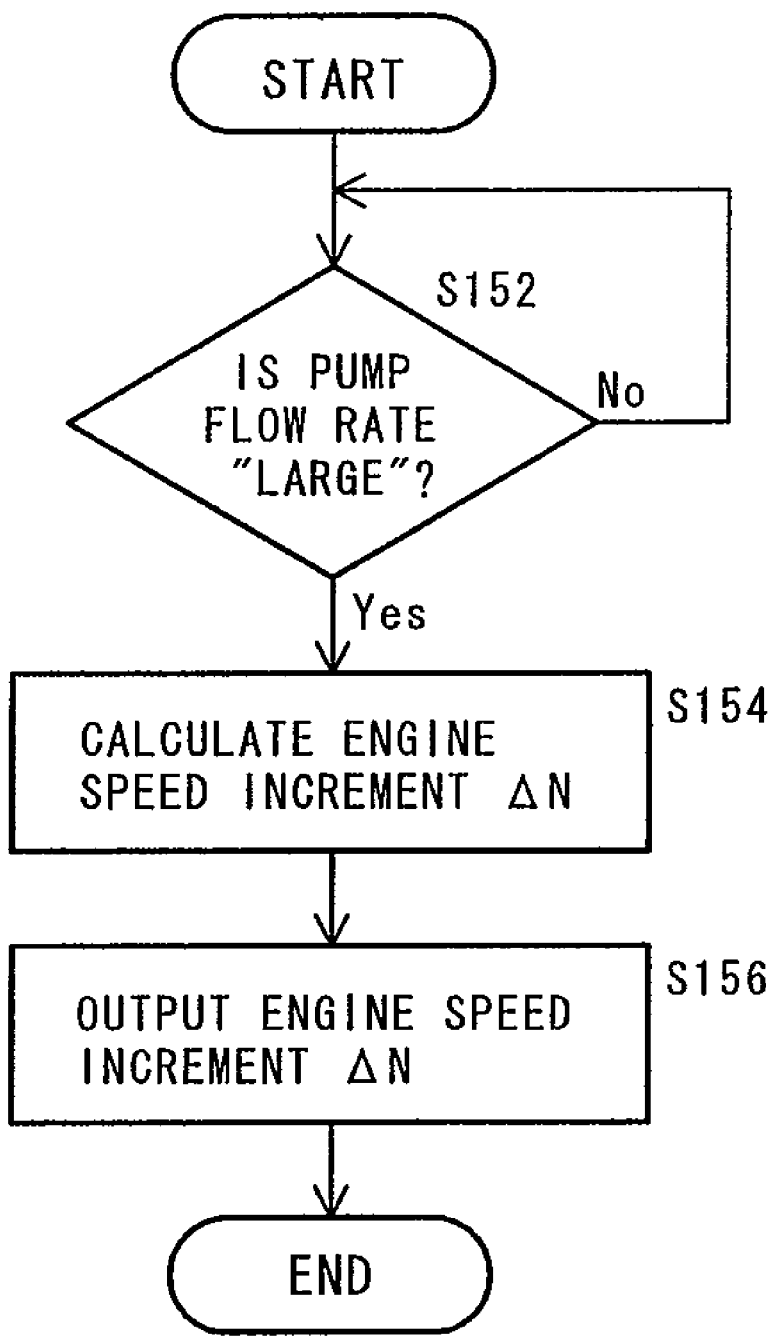
FIG. 7 is a flowchart showing detailed hydraulic pump flow rate control processing in Step S150 of FIG. 4.

FIG. 7 is a flowchart showing detailed hydraulic pump flow rate control processing in Step S150. The pump flow rate control in Step S150 increases the maximum engine speed of the engine 1 to increase the delivery rate of the hydraulic pump 10.

First, the control unit 80 determines whether or not the required flow rate (pump flow rate) of the hydraulic pump 10 selected in Step S130 is "Large" (Step S152), and, if the result of determination is not "Large", performs no operation and repeats the same determination processing. If the pump flow rate selected in Step S130 is "Large", the control unit 80 references a relevant traveling command pressure stored in a memory table to calculate an engine speed increment ΔN (Step S154).

Figure 8:
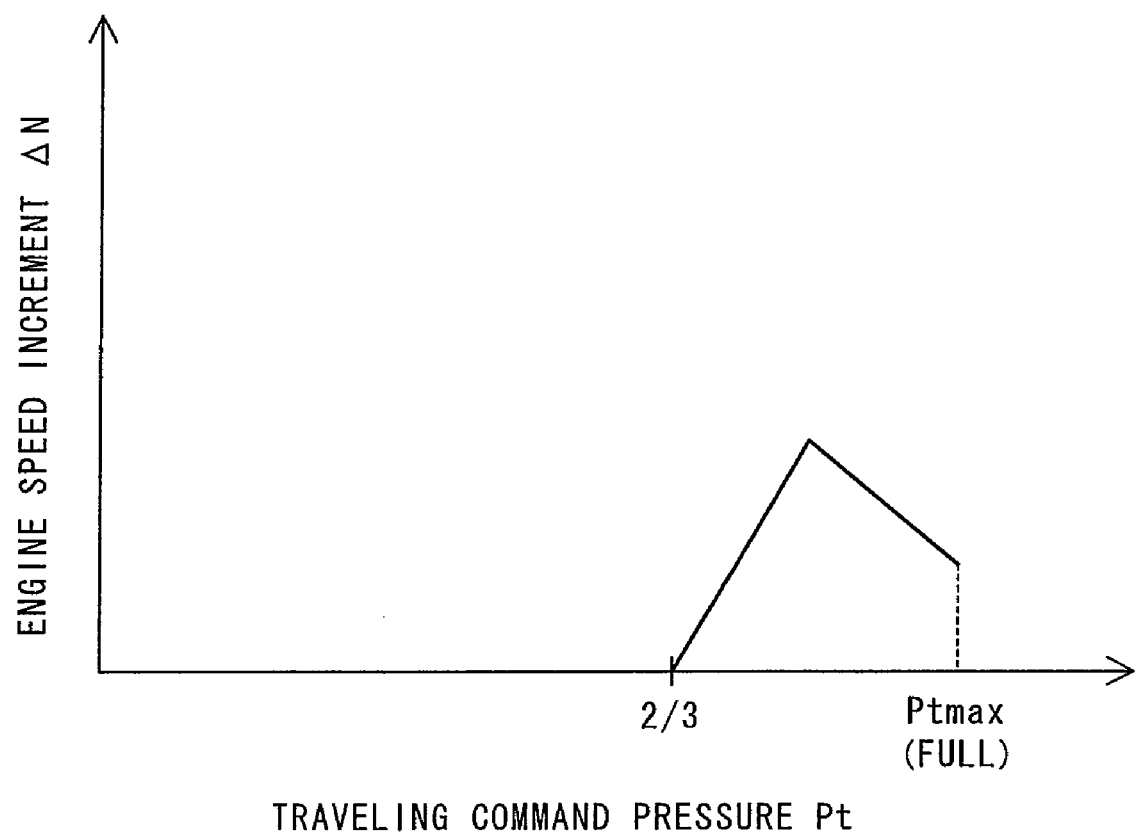
FIG. 8 is a graph showing a relation between an engine speed increment $\Delta N$ and a traveling command pressure used for calculation of the engine speed increment $\Delta N$.

FIG. 8 is a graph showing a relation between a traveling command pressure used for calculation of the engine speed increment ΔN and the engine speed increment ΔN. The relation between the traveling command pressure and the engine speed increment ΔN is set as follows: when the traveling command pressure is lower than two-thirds of the value of the maximum command pressure Ptmax during full pedal operation, the engine speed increment ΔN remains 0; when the traveling command pressure becomes two-thirds or more (high-speed traveling command region) of the maximum command pressure Ptmax, the engine speed increment ΔN increases with increasing traveling command pressure up to a certain pilot pressure (for example, five-sixth of Ptmax), and then the engine speed increment ΔN decreases with increasing traveling command pressure.

Subsequently, the control unit 80 outputs the engine speed increment ΔN calculated in Step S154 to the engine control and calculation unit of the control unit 80 (Step S156).

Figure 9:
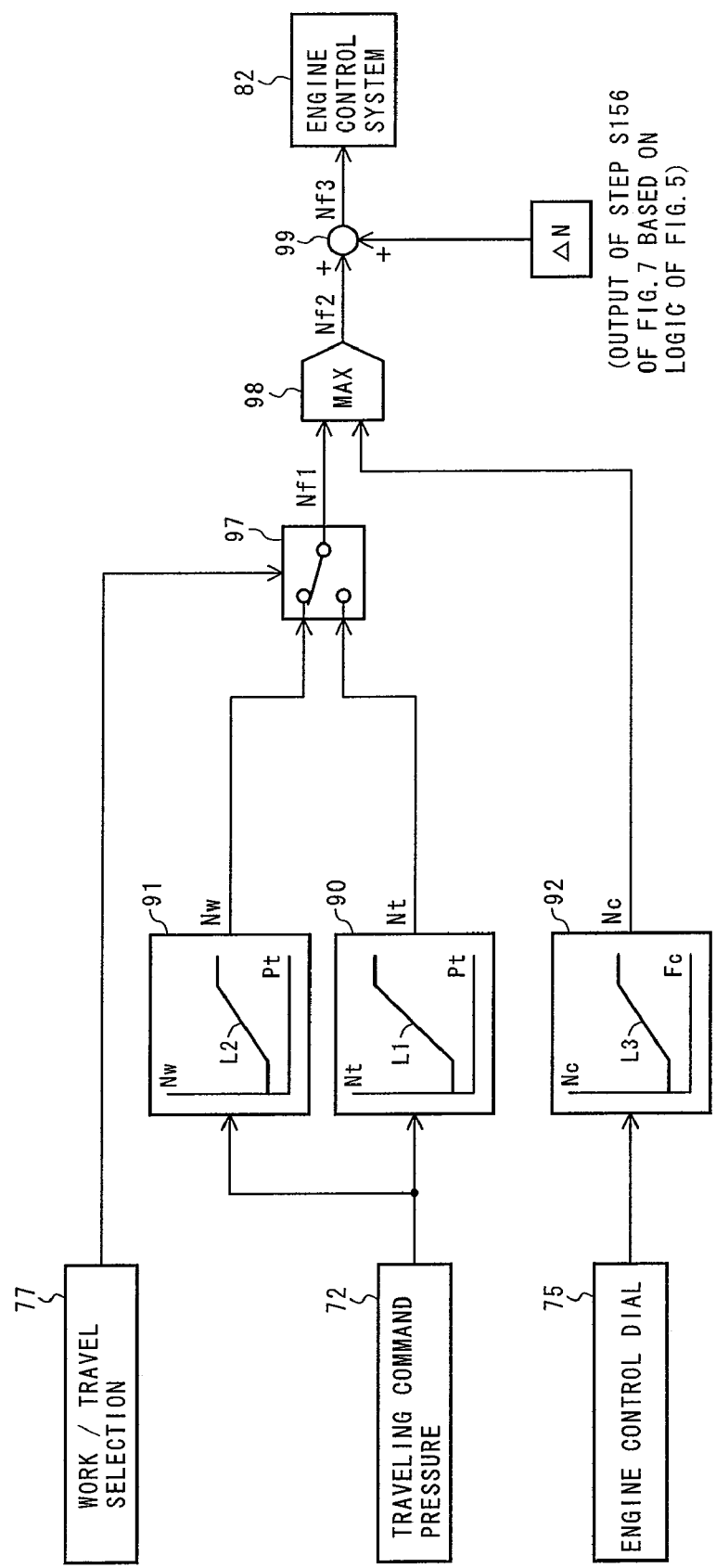
FIG. 9 is a functional block diagram showing the overview of an engine control and calculation unit out of processing functions of the control unit.

FIG. 9 is a functional block diagram showing the overview of the engine control and calculation unit. The engine control and calculation unit includes a travel target-engine speed calculation unit 90, a work target-engine speed calculation unit 91, a reference target-engine speed calculation unit 92, a switching unit 97, a maximum value selection unit 98, and a target-engine speed compensation unit 99.

The travel target-engine speed calculation unit 90 outputs a travel target engine speed Nt proportional to the traveling command pressure (amount of accelerator pedal depression), the work target-engine speed calculation unit 91 outputs a work target engine speed Nw proportional to traveling command pressure (amount of accelerator pedal depression), and the reference target-engine speed calculation unit 92 outputs a target engine speed Nc proportional to the operation amount of the engine control dial 75.

Specifically, the travel target-engine speed calculation unit 90 and the work target-engine speed calculation unit 91 output the travel target engine speed Nt and the work target engine speed Nw determined by functions (engine speed characteristics) L1 and L2 which associate a traveling command pressure Pt detected by the pressure sensor 72 with the target engine speed of the engine 1. The reference target-engine speed calculation unit 92 outputs the reference target engine speed Nc determined by a function (engine speed characteristic) L3 which associates a signal Fc depending on the operation amount of the engine control dial 75a with the target engine speed of the engine 1.

The selection unit 97 selects and outputs either one of the travel target engine speed Nt (based on the characteristic line L1) output from the travel target-engine speed calculation unit 90, and the work target engine speed Nw (based on the characteristic line L2) output from the work target-engine speed calculation unit 91, according to a selection command from the travel/work selector switch 77. Specifically, when travel/work selector switch 77 is switched to the travel position, the selection unit 97 selects the characteristic line L1; when it is switched to the work position, the selection unit 97 selects the characteristic line L2. The target engine speed Nf1 selected by the selection unit 97 is input to the maximum value selection unit 98. The maximum value selection unit 98 selects the target engine speed Nf1 or the target engine speed Nc (based on the characteristic line L3) output from the reference target-engine speed calculation unit 92, whichever larger, and outputs it.

The target engine speed compensation unit 99 adds an engine speed increment ΔN, output in Step S156 of FIG. 7, to the target engine speed Nf2 output from the maximum value selection unit 98 to calculate a final target engine speed Nf3; and outputs the calculated value to the engine control system 82.

Figure 10:
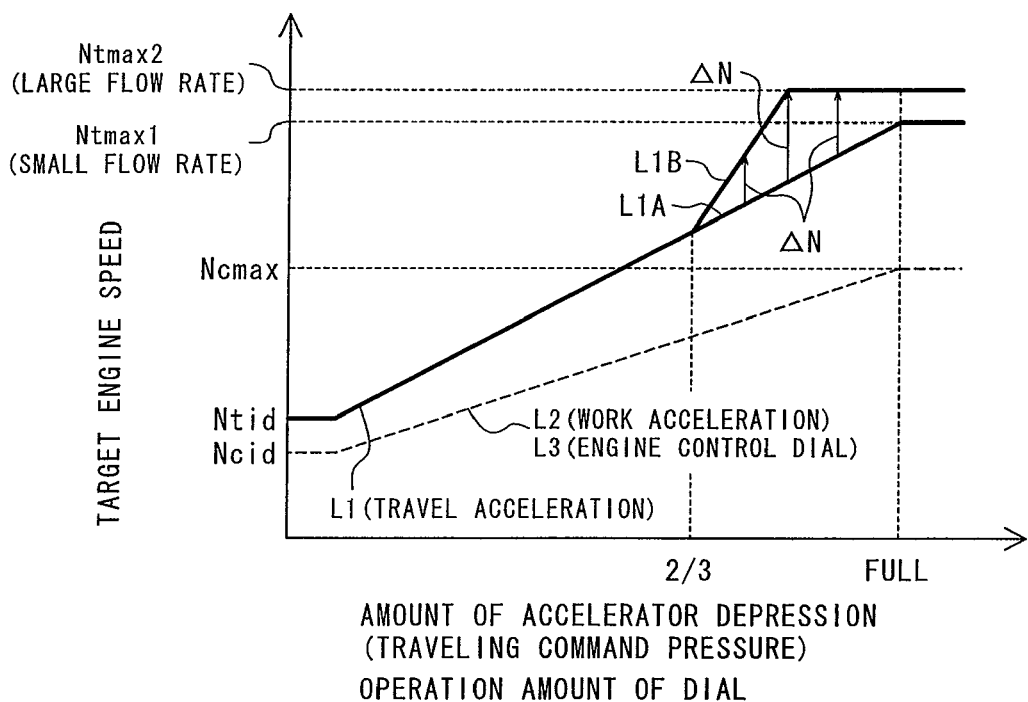
FIG. 10 is a graph showing a relation between a travel target-engine speed characteristic line L1, a work target-engine speed characteristic line L2, and a reference engine speed characteristic line L3; and a relation between the travel target-engine speed characteristic line L1 and the engine speed increment $\Delta N$.

FIG. 10 is a graph showing a relation between characteristic lines L1 to L3 and the engine speed increment ΔN.

The characteristic line L1 is a travel target-engine speed characteristic suitable for traveling depending on the amount of depression of the accelerator pedal 21, and the characteristic line L2 is a work target-engine speed characteristic suitable for work depending on the amount of depression of the accelerator pedal 21. Work refers to excavating works using a work attachment. The characteristic line L1 has a larger rate of increase in target engine speed, that is, a steeper inclination than the characteristic line L2. The characteristic line L3 is a reference engine speed characteristic suitable for work depending on the operation amount of the engine control dial 75. The characteristic lines L2 and L3 have the same inclination, that is, the same rate of change in engine speed with respect to the operation amount, and also have the same idle engine speed Ncid and the same target engine speed Ncmax with respect to full pedal operation.

Further, during traveling, when an engine speed increment ΔN is output in the pump flow rate control calculation processing (Steps S120, S130, and S150 in the drawing) when the traveling HP mode is selected, the target-engine speed compensation unit 99 in the traveling HP mode adds the increment ΔN to the target engine speed Nf2 output from the maximum value selection unit 98. As a result, when the traveling command pressure becomes two-thirds or more (high-speed traveling command region) of the maximum command pressure Ptmax, the associated region of the travel target-engine speed characteristic line L1 changes from L1A to L1B. That is, when the "Small" pump flow rate is selected in Step S130, the characteristic line L1A is set as a travel target-engine speed characteristic for the high-speed traveling command region; when the "Large" pump flow rate is selected, the characteristic line L1B is set as a travel target-engine speed characteristic for the high-speed traveling command region.

Here, the characteristic line L1B has a larger rate of increase in target engine speed, that is, a steeper inclination than the characteristic line L1A. The maximum engine speed Ntmax2 of the characteristic line L1B is made higher than the maximum engine speed Ntmax1 of the characteristic line L1A. For example, the maximum engine speed Ntmax1 is 1650 rpm, and the maximum engine speed Ntmax2 2000 rpm. Since the characteristic line L1B has a steep inclination, the maximum engine speed Ntmax2 is reached before the traveling command pressure reaches the maximum command pressure Ptmax (for example, when the command pressure is five-sixth of Ptmax). The change (increase) in target engine speed of the characteristic line LIB with respect to that of the characteristic line L1A is associated with the relation between the traveling command pressure Pt and the engine speed increment ΔN shown in FIG. 8.

FIG. 11 is a graph showing torque control characteristics of the hydraulic pump regulator 11. The horizontal axis is assigned the delivery pressure (pump pressure) of the hydraulic pump 10, and the vertical axis the volume (displacement volume or tilting of the swash plate) of the hydraulic pump 10.

When the delivery pressure of the hydraulic pump 10 is within a range between P0 and P1 (hereinafter referred to as P0-P1 range), the hydraulic pump regulator 11 does not perform absorption torque control, and the displacement of the hydraulic pump 10 remains the maximum fixed value qmax. When the delivery pressure of the hydraulic pump 10 exceeds P1, the hydraulic pump regulator 11 performs absorption torque control, and the displacement of the hydraulic pump 10 decreases along with a characteristic line A. Accordingly, the absorption torque of the hydraulic pump 10 is controlled so that it does not exceed specified torque (maximum torque) shown by a constant-torque curve TA. When the delivery pressure of the hydraulic pump 10 increases to Pmax, the main relief valve 17 operates to limit further increase in delivery pressure of the hydraulic pump.

FIG. 12 is a PQ diagram showing a relation between the pump pressure and the pump flow rate obtained from limited control of the displacement of the hydraulic pump 10 by the pump regulator 11. The horizontal axis is assigned the delivery pressure (pump pressure) of the hydraulic pump 10, and the vertical axis the delivery rate (pump flow rate) of the hydraulic pump 10.

The delivery rate of the hydraulic pump is a function of product of the displacement and the engine speed of the hydraulic pump. Even with the same pump displacement, the pump flow rate increases with increasing engine speed. In FIG. 9, the solid line is a PQ diagram in a case where the engine speed equals the maximum engine speed Ntmax1, and the dashed line is a PQ diagram in a case where the engine speed equals the maximum engine speed Ntmax2. When the engine speed equals the maximum engine speed Ntmax1 and the delivery pressure of the hydraulic pump 10 is within the P0-P1 range, the pump flow rate equals the maximum flow rate Qmax1 corresponding to the maximum displacement qmax of the hydraulic pump 10. When the delivery pressure of the hydraulic pump 10 exceeds P1, the pump flow rate decreases along with the characteristic line A1 with decreasing pump displacement. Accordingly, the absorption horsepower of the hydraulic pump 10 is controlled so as not to exceed the assigned horsepower when the engine speed equals the maximum engine speed Ntmax1. When the engine speed equals the maximum engine speed Ntmax2 and the delivery pressure of the hydraulic pump 10 is within the P0-P1 range, the pump flow rate equals the maximum flow rate Qmax2 (>Qmax1) corresponding to the maximum displacement qmax of the hydraulic pump 10. When the delivery pressure of the hydraulic pump 10 exceeds P2, the pump flow rate decreases along with the characteristic line A2 with decreasing pump displacement. Accordingly, the absorption horsepower of the hydraulic pump 10 is controlled so as not to exceed the assigned horsepower when the engine speed equals the maximum engine speed Ntmax2. When the engine speed equals the maximum engine speed Ntmax2, in comparison with a case where the engine speed equals the maximum engine speed Ntmax1, the pump flow rate totally increases only by a flow rate ΔQ in relation to an increase in the maximum engine speed, and the maximum flow rate Qmax2 becomes larger than the maximum flow rate Qmax1 by the flow rate ΔQ.

In accordance with the present embodiment, when the "Small" pump flow rate is selected in the pump flow rate control calculation processing, the characteristic line L1A is set as a travel target-engine speed characteristic in the high-speed command region, the maximum engine speed of the engine 1 becomes Ntmax1, and the maximum flow rate of the hydraulic pump 10 becomes the maximum flow rate Qmax1 corresponding to the maximum engine speed Ntmax1. Further, when the "Large" pump flow rate is selected in the pump flow rate control calculation processing, the characteristic line L1B is set as a travel target-engine speed characteristic in the high-speed command region, the maximum engine speed of the engine 1 increases to Ntmax2, and the maximum flow rate of the hydraulic pump 10 increases to the maximum flow rate Qmax2 corresponding to the maximum engine speed Ntmax2.

In accordance with the present embodiment, a relation between the "Small" motor displacement of the hydraulic traveling motor 14 and the maximum flow rate Qmax1 of the hydraulic pump 10 is set so that the flow rate of the hydraulic traveling motor 14 necessary for the vehicle to travel at a preset maximum speed when the "Small" motor displacement is selected equals (agrees with) the maximum flow rate Qmax1 of the hydraulic pump 10 when the "Small" pump flow rate is selected. Further, a relation between the "Middle" motor displacement of the hydraulic traveling motor 14 and the maximum flow rate Qmax2 of the hydraulic pump 10 is set so that the flow rate of the hydraulic traveling motor 14 necessary for the vehicle to travel at a preset maximum speed when the "Middle" motor displacement is selected equals (agrees with) the maximum flow rate Qmax2 of the hydraulic pump 10 when the "Large" pump flow rate is selected. In other words, a relation between the "Small" motor displacement of the hydraulic traveling motor 14 and the maximum flow rate Qmax1 of the hydraulic pump 10 is set so that the maximum vehicle traveling speed when the hydraulic traveling motor 14 is controlled to the "Small" motor displacement and the maximum delivery rate of the hydraulic pump 10 to the "Small" pump flow rate equals a preset maximum speed. Further, a relation between the "Middle" motor displacement of the hydraulic traveling motor 14 and the maximum flow rate Qmax2 of the hydraulic pump 10 is set so that the maximum vehicle traveling speed when the hydraulic traveling motor 14 is controlled to the "Middle" motor displacement and the maximum delivery rate of the hydraulic pump 10 to the "Large" pump flow rate equals a preset maximum speed.

As a result, a relation between the "Small" and "Large" displacements of the hydraulic traveling motor 14 and the maximum flow rates Qmax1 and Qmax2 of the hydraulic pump 10 is set so that the maximum vehicle traveling speed when the "Small" motor displacement and the "Small" pump flow rate are selected nearly equals the maximum vehicle traveling speed when the "Middle" motor displacement and the "Large" pump flow rate are selected.

In the above-mentioned embodiment, the rotational speed pickup 71 (traveling speed detection means), the hydraulic pressure sensor 72 (traveling operation detection means), the hydraulic pressure sensor 73 (drive status detection means), and the voltage sensor 74 (transmission shift position detection means) constitute detection means for detecting parameters regarding the traveling state of the hydraulic traveling vehicle. Processing of Steps S100 and S120 of the control unit 80 shown in FIG. 4 constitutes the operating state determination means for determining the operating state of a hydraulic traveling vehicle based on the parameters regarding the traveling state detected by the detection means. Processing of Steps S130 to S150 of the control unit 80 shown in FIG. 4, the solenoid proportional valve 81, the engine control system 82, and the motor regulator 33 constitute control means for controlling the maximum flow rate supplied to the hydraulic traveling motor 14 and the equivalent displacement of the traveling system including a hydraulic traveling motor 14 according to the result of operating state determination.

Steps S120, S130, and S150 of the control unit 80 shown in FIG. 4, the target engine speed compensation unit 99 shown in FIG. 9, and the engine control system 82, which perform control to vary the maximum engine speed of the engine 1 (prime mover), constitute first control means for controlling the maximum delivery rate of the hydraulic pump 10 at least between the first flow rate (maximum flow rate Qmax1 with the "Small" pump flow rate) and the second flow rate (maximum flow rate Qmax2 with the "Large" pump flow rate) larger than the first flow rate. Steps S120, S130, and S140 of the control unit 80 shown in FIG. 4, the solenoid proportional valve 81, and the motor regulator 33 constitute second control means for controlling the equivalent displacement of the traveling system including a hydraulic traveling motor 14 at least between the first displacement ("Small" motor displacement) and the second displacement ("Middle" motor displacement) larger than the first displacement.

The second flow rate of the hydraulic pump 10 and the second displacement of the traveling system are set so that a flow rate necessary for the vehicle to travel at a preset maximum speed when the equivalent displacement of the traveling system including a hydraulic traveling motor 14 is controlled to the second displacement ("Middle" motor displacement) agrees with the second flow rate (maximum flow rate Qmax2 with the "Large" pump flow rate) of the hydraulic pump 10. Further, the first flow rate of the hydraulic pump 10 and the first displacement of the traveling system are set so that a flow rate necessary for the vehicle to travel at a preset maximum speed when the equivalent displacement of the traveling system including a hydraulic traveling motor 14 is controlled to the first displacement ("Small" motor displacement) agrees with the first flow rate (maximum flow rate Qmax1 with the "Small" pump flow rate) of the hydraulic pump 10.

Operations of the present embodiment will be explained below.

<Acceleration State>

First, a case where the vehicle body is accelerated from a stop state by driver operation will be explained below.

During vehicle body acceleration, when the traveling command pressure exceeds two-thirds of the maximum command pressure Ptmax and the delivery pressure of the hydraulic pump 10 is higher than 20 Mpa, the control unit 80 determines the current traveling state as the acceleration state, selects the "Middle" motor displacement (second displacement) and the "Large" pump flow rate (second flow rate), and controls the displacement of the hydraulic traveling motor 14 and the maximum delivery rate (engine speed) of the hydraulic pump 10 to the selected displacement and flow rate, respectively. With the above-mentioned formula (1), in the sudden acceleration state in which the travel loading pressure converted to the control pressure, Pt, is higher than a control pressure Po for obtaining a target displacement "Middle" only with a control signal output from the solenoid proportional valve 81, the target value Pc of control pressure becomes a negative value. Therefore, a drive signal is not output to the solenoid proportional valve 81, but the servo valve 52 is controlled only by the travel loading pressure led to the first pressure receiver 52*a*. Accordingly, the displacement of the hydraulic traveling motor 14 is controlled to a displacement larger than "Middle" corresponding to the travel loading pressure.

Accordingly, since the displacement of the hydraulic traveling motor 14 is controlled to the preset "Middle" displacement or larger, the drive pressure necessary for acceleration decreases to reduce leak flow rate from the traveling system including a hydraulic traveling motor 14, resulting in improved the overall efficiency during acceleration operation as well as improved acceleration feeling.

Further, although the flow rate of the traveling system necessary for the maximum speed temporarily increases with increasing displacement of the hydraulic traveling motor 14, an increase in engine speed increases the engine power as well as the pump flow rate, making it possible to smoothly accelerate the vehicle up to a preset maximum speed.

Further, when acceleration operation is completed and the delivery pressure of the hydraulic pump 10 decreases, the control unit 80 determines the current traveling state as "Normal" and makes an attempt to select the "Small" motor displacement and "Small" pump flow rate. In this case, a relation between the maximum flow rate Qmax2 and the "Middle" motor displacement is set so that the maximum traveling speed with the "Large" pump flow rate (maximum flow rate Qmax2) and the "Middle" motor displacement equals a preset maximum speed. Further, a relation between the maximum flow rate Qmax1 and the "Small" motor displacement is set so that the maximum traveling speed with the "Small" pump flow rate (maximum flow rate Qmax1) and the "Small" motor displacement equals a preset maximum speed. In other words, the second displacement ("Middle" motor displacement) of the traveling system and the second flow rate (maximum flow rate Qmax2 with the "Large" pump flow rate) of the hydraulic pump 10 are set so that a flow rate necessary for the vehicle to travel at a preset maximum speed when the equivalent displacement of the traveling system including a hydraulic traveling motor 14 is controlled to the second displacement ("Middle" motor displacement) agrees with the second flow rate (maximum flow rate Qmax2 with the "Large" pump flow rate) of the hydraulic pump 10. Further, the first displacement ("Small" motor displacement) of the traveling system and the first flow rate (maximum flow rate Qmax1 with the "Small" pump flow rate) of the hydraulic pump 10 are set so that a flow rate necessary for the vehicle to travel at a preset maximum speed when the equivalent displacement of the traveling system is controlled to the first displacement ("Small" motor displacement) agrees with the first flow rate (maximum flow rate Qmax1 with the "Small" pump flow rate) of the hydraulic pump 10. In this way, favorable vehicle body acceleration performance can be ensured through high horsepower while the vehicle speed is prevented from exceeding a preset maximum speed.

<Slope-Ascending State>

A case where the vehicle body enters the slope-ascending state will be explained below.

In the slope-ascending state, if the traveling speed falls below 10 km/h, the traveling command pressure exceeds two-thirds of the maximum command pressure Ptmax, and the delivery pressure of the hydraulic pump 10 becomes higher than 25 Mpa, the control unit 80 determines the current traveling state as the slope-ascending state, selects the "Middle" motor displacement (second displacement) and the "Large" pump flow rate (second flow rate), and controls the displacement of the hydraulic traveling motor 14 and the delivery rate (engine speed) of the hydraulic pump 10 to the selected displacement and flow rate, respectively. Also in this case, if the travel loading pressure is high like a case where the vehicle is ascending a steep slope, the displacement of the hydraulic traveling motor 14 is controlled to a displacement larger than "Middle" by the travel loading pressure led to the first pressure receiver 52*a* of the servo valve 52.

Accordingly, the displacement of the hydraulic traveling motor 14 increases at least to the preset "Middle" displacement, the engine speed increases, resulting in an increase in pump flow rate as well as engine power, thereby ensuring favorable vehicle speed in the slope-ascending state through high horsepower.

Further, when slope-ascending operation is completed and the delivery pressure of the hydraulic pump 10 decreases, the control unit 80 determines the current traveling state as "Normal" and makes an attempt to select the "Small" motor displacement and "Small" pump flow rate. In this case, a relation between the maximum flow rate Qmax2 and the "Middle" motor displacement is set so that the maximum traveling speed with the "Large" pump flow rate and the "Middle" motor displacement equals a preset maximum speed, and a relation between the maximum flow rate Qmax1 and the "Small" motor displacement is set so that the maximum traveling speed with the "Small" pump flow rate (maximum flow rate Qmax1) and the "Small" motor displacement equals a preset maximum speed, thereby ensuring favorable vehicle speed in the slope-ascending state through high horsepower and preventing the vehicle speed from exceeding a preset maximum speed.

<Deceleration State>

A case where the vehicle is decelerated during traveling on a flat road or in the slope-descending state will be explained below.

In the deceleration state, if the traveling speed is higher than 10 km/h, traveling command pressure falls below one-third of the maximum command pressure Ptmax, and the current transmission shift position is Hi (high-speed shift position), the control unit 80 determines the current traveling state as the deceleration state, selects the "Middle" motor displacement (second displacement) and "Small" pump flow rate (first flow rate), and controls the displacement of the hydraulic traveling motor 14 and the delivery rate (engine speed) of the hydraulic pump 10 to the selected displacement and flow rate, respectively.

In this way, when the deceleration state is detected, the control unit 80 immediately increases the traveling motor displacement to the preset "Middle" displacement, thus attaining sufficient hydraulic braking force even if the vehicle body is in the slope-descending state. Further, only when necessary, the control unit 80 increases the equivalent displacement of the traveling system according to the traveling speed and transmission shift position of vehicle to ensure sufficient hydraulic braking force and prevent degradation of operating performance, such as deceleration shock caused by excessive braking force.

<Slope-Descending State>

A case where the vehicle enters the slope-descending state while the driver does not perform deceleration operation will be explained below.

In the slope-descending state, if the traveling speed is higher than 10 km/h, the traveling command pressure is higher than two-thirds of the maximum command pressure Ptmax, the delivery pressure of the hydraulic pump 10 is lower than 3 Mpa, and the current transmission shift position is Hi (high-speed shift position), the control unit 80 determines the current traveling state as the slope-descending state, selects the "Middle" motor displacement (second displacement) and the "Large" pump flow rate (second flow rate), and controls the displacement of the hydraulic traveling motor 14 and the delivery rate (engine speed) of the hydraulic pump 10 to the selected displacement and flow rate, respectively.

If slope-descending operation is detected, the control unit 80 increases the displacement of the traveling motor 14 up to the preset "Middle" displacement, the engine speed increases, and the delivery rate of the hydraulic pump 10 also increases up to the preset "Large" delivery rate. A relation between the maximum flow rate Qmax2 and the "Middle" motor displacement is set so that the maximum traveling speed with the "Large" pump flow rate (maximum flow rate Qmax2) and the "Middle" motor displacement equals a preset maximum speed, and a relation between the maximum flow rate Qmax1 and the "Small" motor displacement is set so that the maximum traveling speed with the "Small" pump flow rate (maximum flow rate Qmax1) and "Small" motor displacement equals a preset maximum speed. In this way, slope-descending operation can be performed while maintaining the maximum speed, and accordingly the increase in hydraulic braking force can prevent the vehicle body from accelerating by its weight exceeding a preset maximum speed.

<Effects>

In accordance with the present embodiment as mentioned above, parameters regarding the vehicle traveling state are detected to determine the vehicle operating state, and the displacement of the hydraulic traveling motor 14 and the maximum delivery rate of the hydraulic pump 10 are controlled according to the result of determination, thereby ensuring favorable traveling performance without degrading the fuel efficiency.

Specifically, in a state requiring deceleration, increasing the displacement of the hydraulic traveling motor 14 to "Middle" can ensure sufficient braking force and attain favorable operation feeling.

Although the maximum speed cannot be ensured in the slope-descending state only by increasing the displacement of the hydraulic traveling motor 14, the displacement of the hydraulic traveling motor 14 is increased and, at the same time, the maximum delivery rate of the hydraulic pump 10 is controlled to "Large" to increase the maximum flow rate of the traveling system, thus allowing the vehicle to descend a slope at a stable speed.

Further, during acceleration operation with up to the maximum speed, increasing displacement of the hydraulic traveling motor 14 decreases the drive pressure necessary for acceleration and accordingly the leak flow rate from the traveling system including a hydraulic traveling motor 14 decreases, thus increasing the overall efficiency and improving acceleration feeling during acceleration operation.

In a state requiring neither deceleration nor acceleration, decreasing the displacement of the hydraulic traveling motor 14 to a displacement smaller than the normally required value decreases a flow rate necessary to maintain the speed and restrains pressure loss produced in pipes of the traveling system. This improves the fuel efficiency and reduces heat generation produced in pressure loss, thus reducing the size of a cooling device necessary for the vehicle body.

The maximum engine speed of the engine 1 is increased to control the maximum delivery rate of the hydraulic pump 10 as well as the displacement of the hydraulic traveling motor 14. Further, the second displacement ("Middle" motor displacement) of the traveling system and the second flow rate (maximum flow rate Qmax2 with the "Large" pump flow rate) of the hydraulic pump 10 are set so that a flow rate necessary for the vehicle to travel at a preset maximum speed when the displacement of the hydraulic traveling motor 14 is controlled to "Middle" agrees with the second flow rate (maximum flow rate Qmax2 with the "Large" pump flow rate) of the hydraulic pump 10. This makes it possible to simply and securely prevent vehicle speed increase accompanying an increase in maximum engine speed of the engine 1.

Further, the maximum engine speed of the engine 1 is increased to control the maximum delivery rate of the hydraulic pump 10 as well as the displacement of the hydraulic traveling motor 14, thereby ensuring favorable traveling performance through high horsepower.

Another embodiment of the present invention will be explained below with reference to FIGS. 13 to 17. With the present embodiment, in operating states other than the acceleration state, like a first embodiment, the determination and selection table shown in FIG. 5 is used to control the motor displacement and pump flow rate. In the acceleration state, vehicle speed deviation is used to control the motor displacement and pump flow rate.

First, hydraulic pump flow rate control using vehicle speed deviation in the acceleration state will be explained below. With the present embodiment, pump flow rate control is performed by varying the maximum engine speed.

Figure 13:
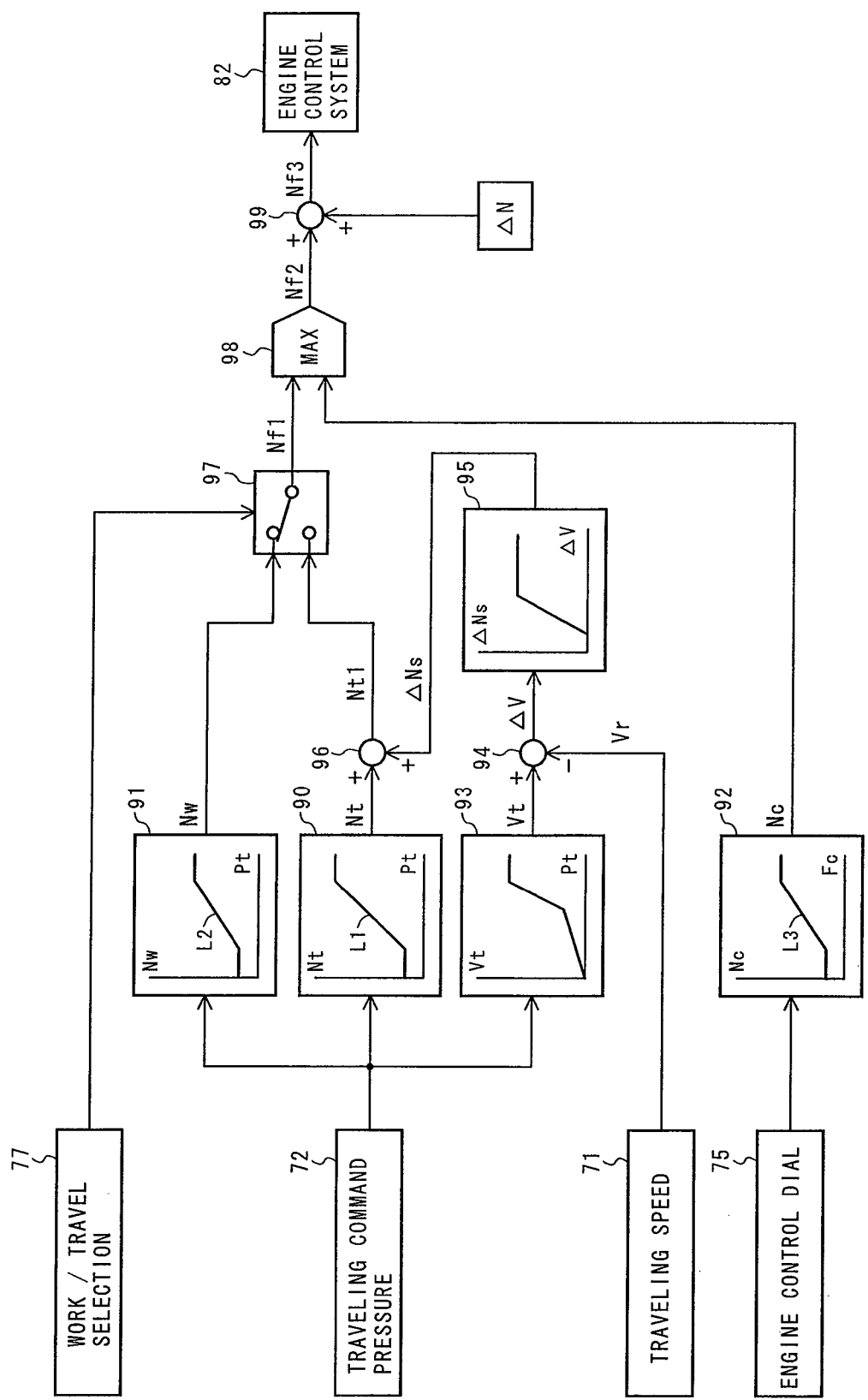
FIG. 13 is a functional block diagram showing the overview of the engine control and calculation unit out of the processing functions of the control unit according to another embodiment of the present invention.

FIG. 13 is a functional block diagram showing the overview of the engine control and calculation unit including the function for controlling the pump flow rate by use of a vehicle speed deviation in the acceleration state. In FIG. 13, a member equivalent to that of FIG. 9 is assigned the same reference numeral.

The engine control and calculation unit according to the present embodiment includes the travel target-engine speed calculation unit 90, the work target-engine speed calculation unit 91, the reference target-engine speed calculation unit 92, the switching unit 97, the maximum value selection unit 98, and the target engine speed compensation unit 99 shown in FIG. 9. The engine control and calculation unit further includes a target vehicle speed calculation unit 93, a vehicle speed deviation calculation unit 94, an acceleration engine speed-increment calculation unit 95, and an acceleration target-engine speed compensation unit 96.

The target vehicle speed calculation unit 93 outputs a target vehicle speed Vt corresponding to the traveling command pressure (amount of accelerator pedal depression). The vehicle speed deviation calculation unit 94 subtracts an actual traveling speed Vr from the target vehicle speed Vt to calculate a vehicle speed deviation $\Delta V$. The acceleration engine speed-increment calculation unit 95 calculates a compensation engine speed increment for acceleration ($\Delta Ns$) according to the vehicle speed deviation $\Delta V$. The acceleration target-engine speed compensation unit 96 adds the increment $\Delta Ns$ to a travel target engine speed Nt for correction and outputs a resultant travel target engine speed Nt1.

Figure 14:
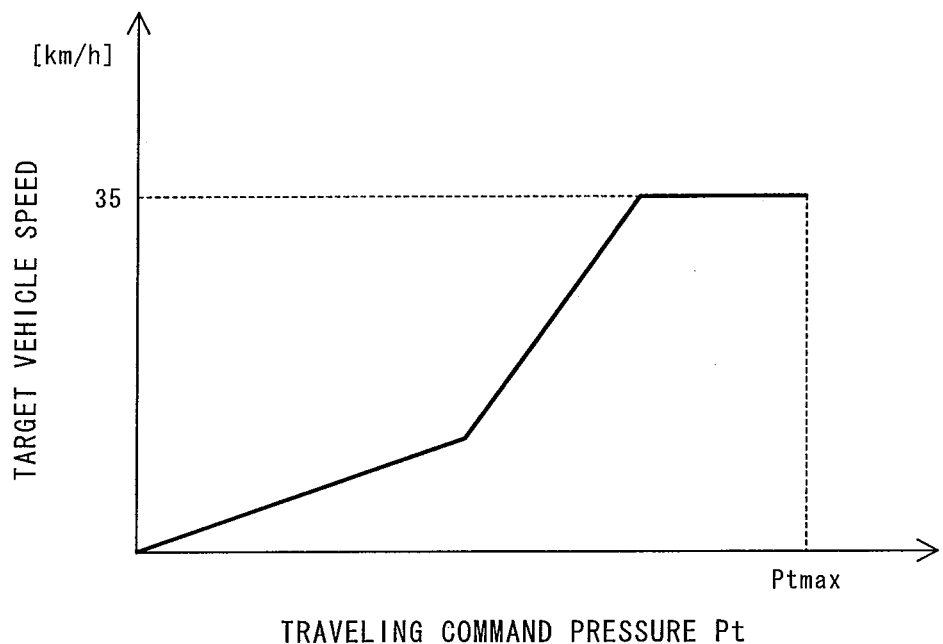
FIG. 14 is a graph showing a relation between a traveling command pressure (amount of accelerator pedal depression) Pt and a target vehicle speed Vt set in a target vehicle speed calculation unit.

FIG. 14 is a graph showing a relation between the traveling command pressure (amount of accelerator pedal depression) Pt and the target vehicle speed Vt set in the target vehicle speed calculation unit 93. The target vehicle speed Vt increases with increasing traveling command pressure Pt.

Figure 15:
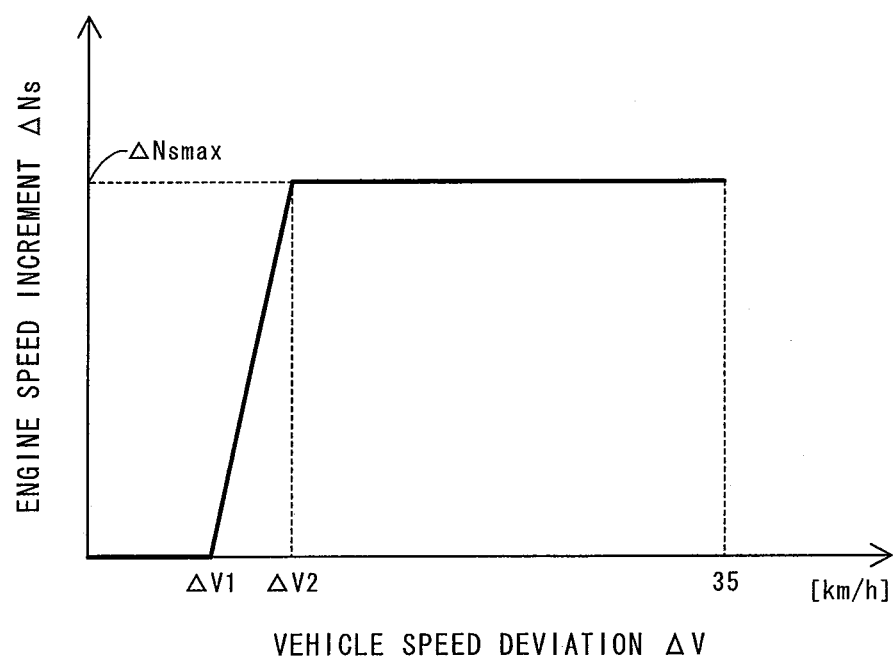
FIG. 15 is a graph showing a relation between a vehicle speed deviation $\Delta V$ and a compensation engine speed increment for acceleration ($\Delta Ns$) set in an acceleration engine speed-increment calculation unit.

FIG. 15 is a graph showing a relation between the vehicle speed deviation $\Delta V$ and the compensation engine speed increment for acceleration ($\Delta Ns$) set in the acceleration engine speed-increment calculation unit 95. The engine speed increment $\Delta Ns$ remains 0 until the vehicle speed deviation $\Delta V$ reaches a first value $\Delta V1$. When the vehicle speed deviation $\Delta V$ exceeds the first value $\Delta V1$, the current traveling state is determined as the acceleration state, and the increment $\Delta Ns$ is steeply increased in proportion to the increase in the vehicle speed deviation ΔV. When the vehicle speed deviation ΔV exceeds a second value ΔV2, the increment ΔNs is set to a maximum value ΔNsmax.

Figure 16:
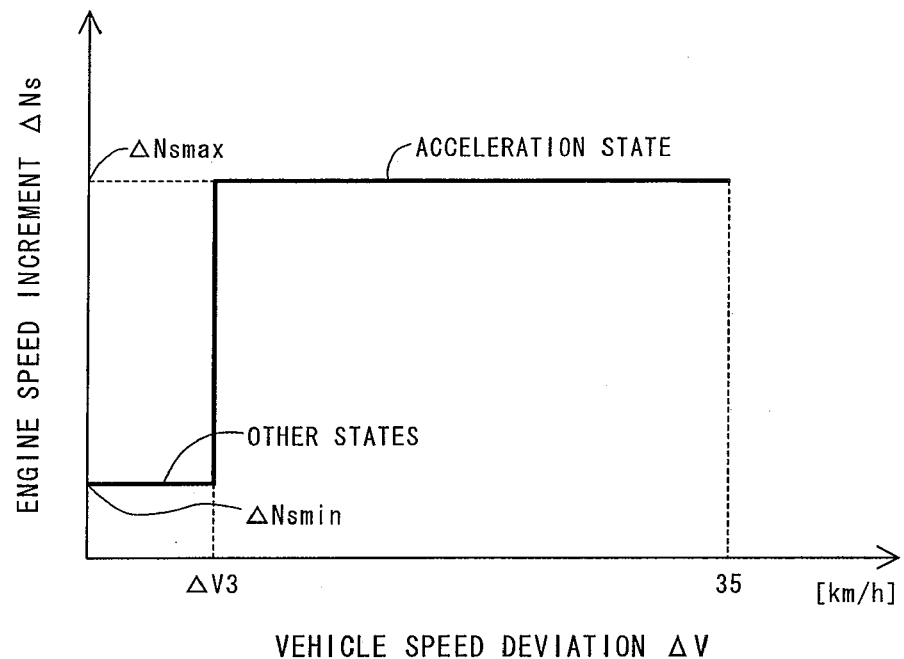
FIG. 16 is a graph showing a modification of the relation between the vehicle speed deviation $\Delta V$ and the compensation engine speed increment for acceleration ($\Delta Ns$).

FIG. 16 is a graph showing a modification of the relation between the vehicle speed deviation ΔV and the compensation engine speed increment for acceleration (ΔNs). The increment ΔNs remains a minimum value Nsmin until the vehicle speed deviation ΔV reaches a value ΔV3. When the increment ΔNs exceeds the value ΔV3, the increment ΔNs is increased up to the maximum value ΔNsmax in step manner.

The increment ΔNs is added to the travel target engine speed Nt in the acceleration target-engine speed compensation unit 96 as mentioned above, and accordingly a final target engine speed Nf3 increases. Like the first embodiment, when the increment ΔNs is output, the maximum engine speed of the engine 1 increases from Ntmax1 to Ntmax2, and the maximum delivery rate of the hydraulic pump 10 increases from Qmax1 to Qmax2. When output of the increment ΔNs is stopped, the maximum engine speed of the engine 1 returns to Ntmax1, and the maximum delivery rate of the hydraulic pump 10 decreases to Qmax2.

Motor displacement control using a vehicle speed deviation in the acceleration state will be explained below.

Figure 17:
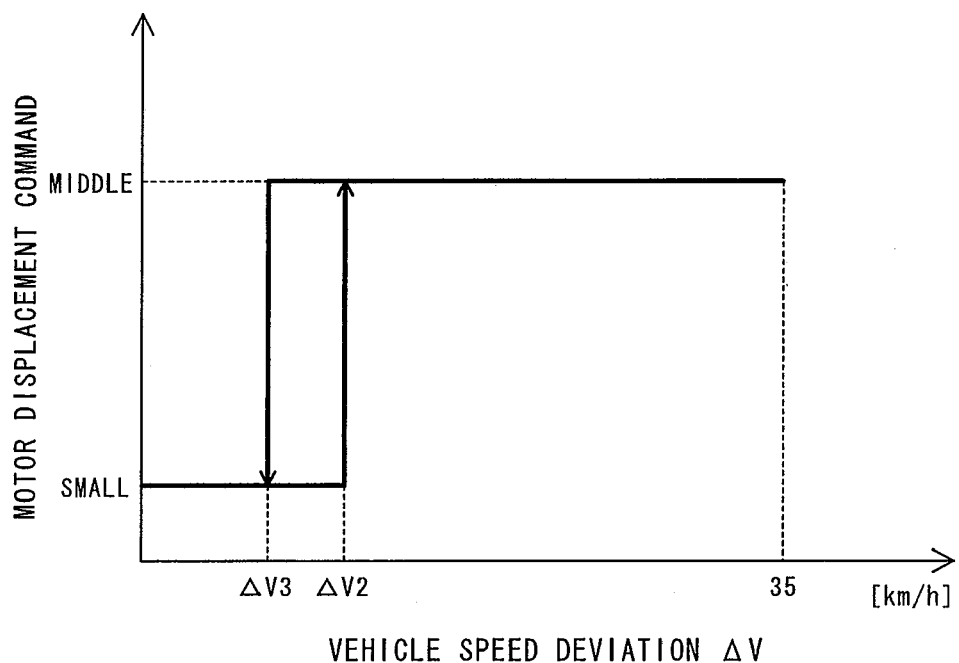
FIG. 17 is a graph showing a relation between the vehicle speed deviation $\Delta V$ and a motor displacement control command when the current traveling state is determined as the acceleration state using the vehicle speed deviation $\Delta V$ to control the motor displacement.

FIG. 17 is a graph showing a relation between the vehicle speed deviation ΔV and a motor displacement command. The motor displacement command remains "Small" until the vehicle speed deviation ΔV reaches a second value ΔV2. When the vehicle speed deviation ΔV exceeds the second value ΔV1, the current traveling state is determined as the acceleration state and the motor displacement command is changed to "Middle." Hysteresis is given to the transition of the motor displacement command. When the vehicle speed deviation ΔV decreases, the motor displacement command remains "Middle" until the vehicle speed deviation ΔV reaches a first value ΔV1. When the vehicle speed deviation ΔV becomes smaller than the first value ΔV1, the control unit 80 determines that acceleration operation is completed and changes the motor displacement command to "Small."

When the motor displacement command is changed to "Middle", like the processing of Step S144 of FIG. 6, the control unit 80 outputs a drive signal (motor displacement command signal: voltage signal) Em associated with the solenoid proportional valve 81. Accordingly, when motor displacement command is changed to "Middle", the displacement of the hydraulic traveling motor 14 increases to "Middle." When the motor displacement command is changed to "Small", the displacement of the hydraulic traveling motor 14 decreases to "Small."

The thus-configured present embodiment can also attain the same effects as those in the first embodiment.

Still another embodiment of the present invention will be explained below with reference to FIGS. 18 to 20. In operating states other than slope-ascending state, like the first embodiment, the present embodiment controls the motor displacement and pump flow rate based on the determination and selection table shown in FIG. 5. In the slope-ascending state, the present embodiment controls the motor displacement and pump flow rate by use of only the delivery pressure (pump pressure) of the hydraulic pump 10.

First, hydraulic pump flow rate control using pump pressure in the slope-ascending state will be explained below. Also in the present embodiment, pump flow rate control is performed by varying the maximum engine speed.

Figure 18:
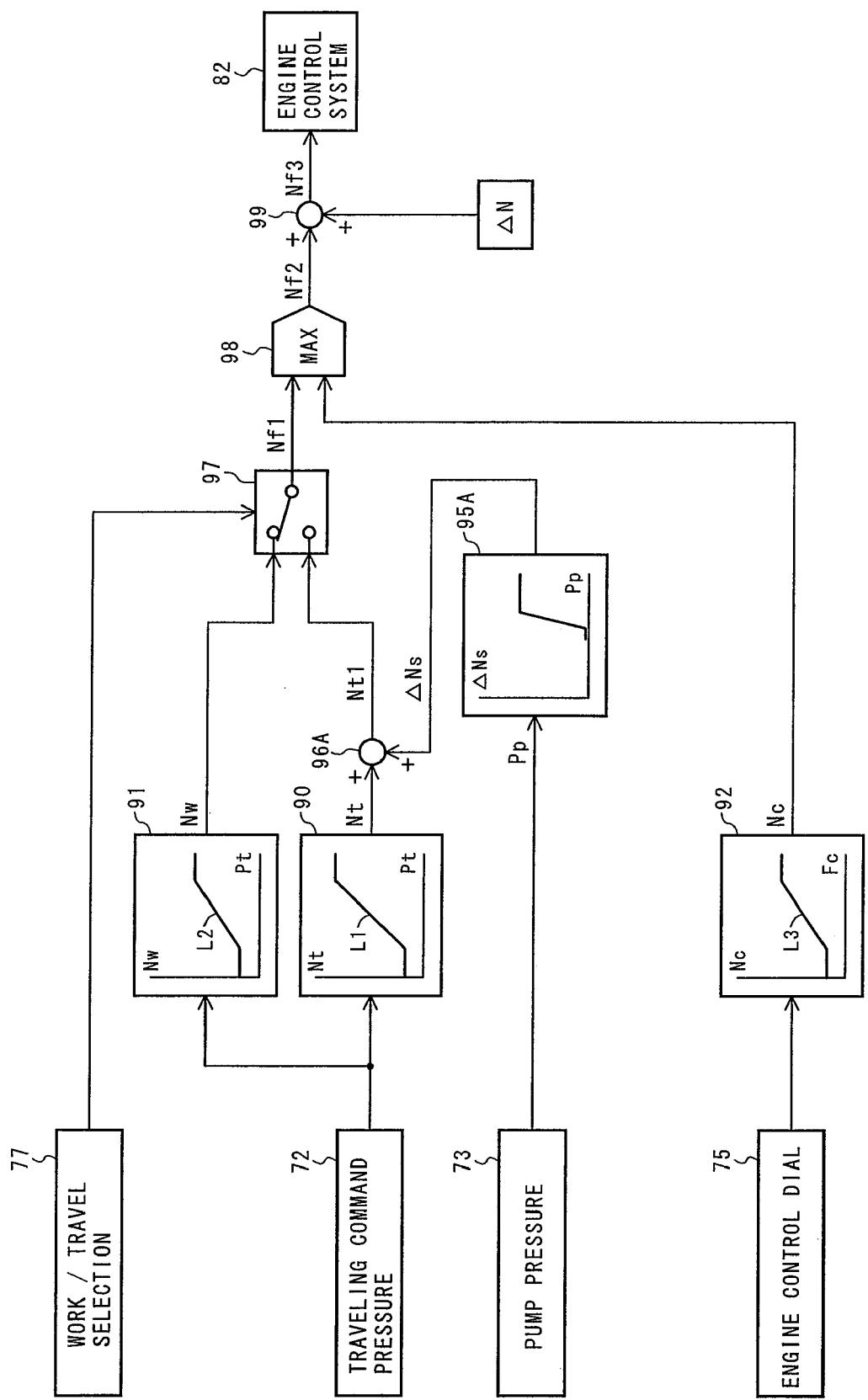
FIG. 18 is a functional block diagram showing the overview of the engine control and calculation unit out of processing functions of the control unit according to still another embodiment of the present invention.
Figure 19:
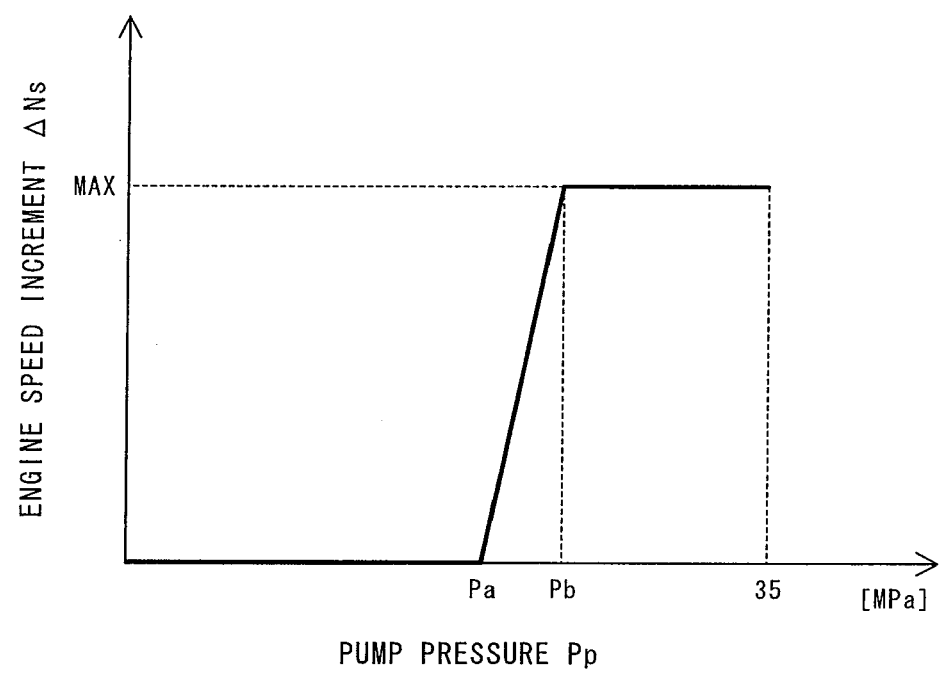
FIG. 19 is a graph showing a relation between a pump pressure and an engine speed increment ΔNs set in a slope-ascending engine speed-increment calculation unit.

FIG. 18 is a functional block diagram showing the overview of the engine control and calculation unit including functions for controlling the pump flow rate by use of the pump pressure in the slope-ascending state. In FIG. 18, a member equivalent to that of FIG. 9 is assigned the same reference numeral.

The engine control and calculation unit of the present embodiment includes the travel target-engine speed calculation unit 90, the work target-engine speed calculation unit 91, the reference target-engine speed calculation unit 92, the switching unit 97, the maximum value selection unit 98, and the target engine speed compensation unit 99 shown in FIG. 9. The engine control and calculation unit further includes a slope-ascending engine speed-increment calculation unit 95A and a slope-ascending target-engine speed compensation unit 96A.

The slope-ascending engine speed-increment calculation unit 95A calculates a compensation engine speed increment for slope-ascending (ΔNs) based on the delivery pressure (pump pressure) Pp of the hydraulic pump 10 detected by the pressure sensor 73. The slope-ascending target-engine speed compensation unit 96A adds the increment ΔNs to the travel target engine speed Nt for correction and outputs a resultant travel target engine speed Nt1.

FIG. 18 is a graph showing a relation between the pump pressure Pp and the compensation engine speed increment for slope-ascending (ΔNs) set in the slope-ascending engine speed-increment calculation unit 95A. The engine speed increment ΔNs remains 0 until the delivery pressure (pump pressure) Pp of the hydraulic pump 10 reaches a first value Pa. When the pump pressure Pp exceeds a first value Pa, the current traveling state is determined as the slope-ascending state and the increment ΔNs is steeply increased in proportion to the increase in the pump pressure Pp. When the pump pressure Pp exceeds a second value Pb, the increment ΔNs is set to a maximum value ΔNsmax.

The increment ΔNs is added to the travel target engine speed Nt in the slope-ascending target-engine speed compensation unit 96A as mentioned above, and accordingly a final target engine speed Nf3 increases. Like the first embodiment, when the increment ΔNs is output, the maximum engine speed of the engine 1 increases from Ntmax1 to Ntmax2, and the maximum delivery rate of the hydraulic pump 10 increases from Qmax1 to Qmax2. When output of the increment ΔNs is stopped, the maximum engine speed of the engine 1 returns to Ntmax1, and the maximum delivery rate of the hydraulic pump 10 decreases to Qmax2.

Motor displacement control using the pump pressure in the slope-ascending state will be explained below.

Figure 20:
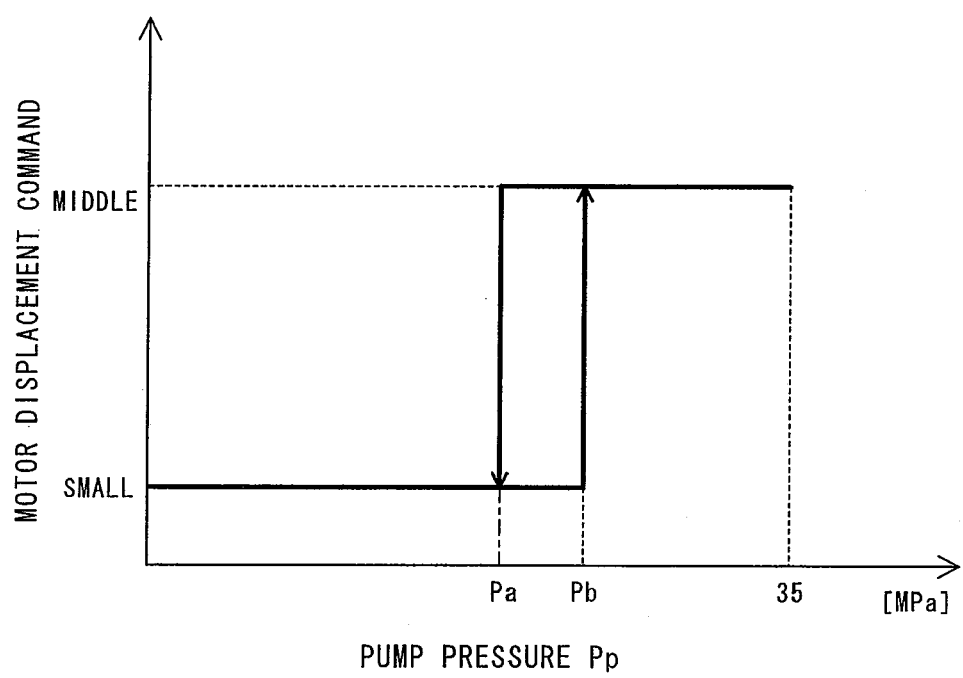
FIG. 20 is a graph showing a relation between the pump pressure and the motor displacement control command when slope-ascending operation is determined by use of the pump pressure to control the motor displacement.

FIG. 20 is a graph showing a relation between the pump pressure Pp and the motor displacement command. The motor displacement command remains "Small" until the pump pressure Pp reaches the second value Pb. When the pump pressure Pp exceeds the second value Pb, the control unit 80 determines the current traveling state as the slope-ascending state and changes the motor displacement command to "Middle." Hysteresis is given to the transition of the motor displacement command. When the pump pressure Pp decreases, the motor displacement command remains "Middle" until the pump pressure Pp reaches the first value Pa. When the pump pressure Pp falls below the first value Pa, the control unit 80 determines that slope-ascending operation is completed and changes the motor displacement command to "Small."

When the motor displacement command is changed to "Middle", like the processing of Step S144 of FIG. 6, a drive signal (motor displacement command signal: voltage signal) Em associated with the solenoid proportional valve 81 is output. Accordingly, when the motor displacement command is changed to "Middle", the displacement of the hydraulic traveling motor 14 increases to "Middle." When the motor displacement command is changed to "Small", the displacement of the hydraulic traveling motor 14 decreases to "Small."

The thus-configured present embodiment can also attain the same effects as those in the first embodiment.

While the present invention has specifically been explained based on the above-mentioned embodiments, the present invention is not limited thereto but can be modified in diverse ways without departing from the spirit and scope thereof.

For example, although an open hydraulic circuit of the traveling system connecting the hydraulic traveling motor 14 with the hydraulic pump 10 has specifically been explained in the above-mentioned embodiments, the present invention is also applicable to a closed hydraulic circuit of the traveling system having the same configuration.

Further, although the displacement of the hydraulic traveling motor 14 is increased using an external command in the above-mentioned embodiments, it is also possible to change the transmission such as the transmission 15 of the traveling system to increase the reduction gear ratio to increase the equivalent displacement of the traveling system (including the hydraulic traveling motor 14). With this method, the same effects can be obtained.

Further, although the engine speed of the engine 1 is increased to increase the pump flow rate to increase the maximum flow rate (traveling flow rate) of the traveling system in the above-mentioned embodiments, it is also possible to increase the maximum displacement of the hydraulic pump if the hydraulic pump used has a sufficient displacement. Further, when a directional control valve with load sensing control is used in a vehicle having an open-circuit of the traveling system, it is also possible to change the maximum flow rate of the traveling system through changeover of an LS differential pressure (difference between pressures before and after the directional control valve).

Further, when a plurality of hydraulic pumps are used and delivered fluid thereof are merged to obtain the maximum flow rate (traveling flow rate), it is also possible to obtain the maximum flow rate by changing the number of hydraulic pumps for delivered fluid to be merged.

Further, it is possible to specify whether or not control according to the present invention is applied for each shift position in relation to the reduction gear ratio of the transmission, and improve the vehicle traveling performance through changeover of the displacement of the hydraulic traveling motor.

For example, with a vehicle having a three-shift-position transmission, at the third shift position at which the displacement remarkably decreases, control according to the present invention is applied and the displacement of the hydraulic traveling motor after speed change is increased, thereby ensuring sufficient hydraulic braking force. On the contrary, at the first shift position at which the equivalent displacement becomes large enough, control according to the present invention is canceled to prevent the braking force from remarkably increasing in the deceleration state, thus avoiding large shock occurrence during deceleration operation.

Further, at the second shift position, control according to the present invention is applied and the motor displacement after speed change is made smaller than that of the third shift position, thereby ensuring sufficient braking force and favorable deceleration feeling.

Further, although a case of a directional control valve of hydraulic pilot type has specifically been explained in the above-mentioned embodiments, the present invention is also applicable to a vehicle of fly-by-wire type with which an electric lever or the like is used to operate the directional control valve through a controller.

Further, although an example where the hydraulic pump 10 is used only for a travel drive circuit has specifically been explained in the above-mentioned embodiments, the present invention can be appropriately applied if independent traveling operation or combined operation is determined based on the pump pressure and operation signals from other actuators even in the case where a non-traveling actuator is driven by a multiple type directional control valve.

The invention claimed is:

1. A traveling control apparatus for a hydraulic traveling vehicle, comprising:
   a hydraulic pump driven by a prime mover;
   a variable-displacement hydraulic traveling motor driven by hydraulic fluid supplied from the hydraulic pump;
   a directional control valve provided between the hydraulic pump and the hydraulic traveling motor;
   a transmission provided in an output section of the hydraulic traveling motor; and
   tires driven by the traveling motor through the transmission;
   wherein the traveling control apparatus includes:
   detection means for detecting multiple parameters regarding the traveling state of the hydraulic traveling vehicle;
   traveling state determination means for determining the traveling state of the hydraulic traveling vehicle based on the multiple parameters regarding the traveling state; and
   control means for controlling the maximum flow rate of the hydraulic fluid supplied to the hydraulic traveling motor through the directional control valve and the equivalent displacement of the traveling system including the hydraulic traveling motor and the transmission according to the result of traveling state determination.

2. The traveling control apparatus for a hydraulic traveling vehicle according to claim 1, wherein:
   the control means controls the displacement of the hydraulic traveling motor to control the equivalent displacement of the traveling system including the hydraulic traveling motor and the transmission.

3. The traveling control apparatus for a hydraulic traveling vehicle according to claim 1, further comprising:
   a transmission (15) provided in an output section of the hydraulic traveling motor (14);
   wherein the control means controls the equivalent displacement of the traveling system including the hydraulic traveling motor through changeover of the reduction gear ratio of the transmission.

4. The traveling control apparatus for a hydraulic traveling vehicle according to claim 1, wherein:
   the control means controls the engine speed of the prime mover to vary the delivery rate of the hydraulic pump, thus controlling the maximum flow rate supplied to the hydraulic traveling motor.

5. The traveling control apparatus for a hydraulic traveling vehicle according to claim 1, wherein:
   the control means controls the maximum displacement of the hydraulic pump (10) to vary the delivery rate of the hydraulic pump, thus controlling the maximum flow rate supplied to the hydraulic traveling motor (14).

6. The traveling control apparatus for a hydraulic traveling vehicle according to claim 1, further comprising:
   a directional control valve (12) between the hydraulic pump (10) and the hydraulic traveling motor (14);

wherein the control means controls the maximum flow rate supplied to the hydraulic traveling motor by means of the directional control valve.

7. The traveling control apparatus for a hydraulic traveling vehicle according to claim 1, wherein:
the operating state determination means determines at least whether the traveling state is either the normal traveling state or the slope-descending state;
wherein, when the traveling state is the normal traveling state, the control means controls the maximum flow rate supplied to the hydraulic traveling motor to a predetermined first flow rate, and the equivalent displacement of the traveling system including the hydraulic traveling motor to a first displacement (equivalent displacement) that can ensure a preset maximum traveling speed with the first flow rate; and
wherein, when the traveling state is the slope-descending state, the control means controls the equivalent displacement of the traveling system including the hydraulic traveling motor to the second displacement larger than the first displacement, and the maximum flow rate supplied to the hydraulic traveling motor to the second flow rate that can ensure a preset maximum speed with the second displacement.

8. The traveling control apparatus for a hydraulic traveling vehicle according to claim 7,
wherein the operating state determination means further determines whether the traveling state is the deceleration state; and
wherein, when the traveling state is the deceleration state, the control means controls the maximum flow rate supplied to the hydraulic traveling motor to the first flow rate, and the equivalent displacement of the traveling system including the hydraulic traveling motor to the second displacement.

9. The traveling control apparatus for a hydraulic traveling vehicle according to claim 1,
wherein the operating state determination means determines at least whether the traveling state is either the normal traveling state or the acceleration state;
wherein, when the traveling state is the normal traveling state, the control means controls the maximum flow rate supplied to the hydraulic traveling motor to the first flow rate, and the equivalent displacement of the traveling system including the hydraulic traveling motor to the first displacement; and
wherein, when the traveling state is the acceleration state, the control means controls the maximum flow rate supplied to the hydraulic traveling motor to the second flow rate larger than the first flow rate, and the equivalent displacement of the traveling system including the hydraulic traveling motor to the second displacement larger than the first displacement.

10. The traveling control apparatus for a hydraulic traveling vehicle according to claim 1,
wherein the operating state determination means determines at least whether the traveling state is either the normal traveling state or the slope-ascending state;
wherein, when the traveling state is the normal traveling state, the control means controls the maximum flow rate supplied to the hydraulic traveling motor to the first flow rate, and the equivalent displacement of the traveling system including the hydraulic traveling motor to the first displacement; and
wherein, when the traveling state is the slope-ascending state, the control means controls the maximum flow rate supplied to the hydraulic traveling motor to the second flow rate larger than the first flow rate, and the equivalent displacement of the traveling system including the hydraulic traveling motor to the second displacement larger than the first displacement.

11. The traveling control apparatus for a hydraulic traveling vehicle according to claim 1, wherein:
the detection means detects at least a traveling speed of the hydraulic traveling vehicle, a traveling operation command for driving the hydraulic traveling motor, and the delivery pressure of the hydraulic pump as multiple parameters regarding the traveling state of the hydraulic traveling vehicle.

12. A traveling control apparatus for a hydraulic traveling vehicle, comprising
a hydraulic pump) driven by a prime mover;
a variable-displacement hydraulic traveling motor driven by the hydraulic fluid supplied from the hydraulic pump;
a directional control valve provided between the hydraulic pump and the hydraulic traveling motor;
a transmission provided in an output section of the hydraulic traveling motor; and
tires driven by the traveling motor through the transmission;
wherein the traveling control apparatus includes:
detection means for detecting multiple parameters regarding the traveling state of the hydraulic traveling vehicle;
traveling state determination means for determining the traveling state of the hydraulic traveling vehicle based on the multiple parameters regarding the traveling state; and
control means for controlling the maximum flow rate of the hydraulic fluid supplied to the hydraulic traveling motor through the directional control valve and the equivalent displacement of the traveling system including the hydraulic traveling motor and the transmission according to the result of traveling state determination; and
wherein, the control means includes:
first control means for varying the maximum engine speed of the prime mover according to the result of operating state determination to control the maximum delivery rate of the hydraulic pump at least between the first and second flow rates, the second flow rate being larger than the first flow rate; and second control means for controlling the equivalent displacement of the traveling system including the hydraulic traveling motor at least between the first and second displacements, the second displacement being larger than the first displacement, according to the result of operating state determination; and
wherein the second flow rate of the hydraulic pump and the second displacement of the traveling system are set so that a flow rate necessary for the vehicle to travel at a preset maximum speed when the equivalent displacement of the traveling system including the hydraulic traveling motor is controlled to the second displacement agrees with the second flow rate of the hydraulic pump.

13. The traveling control apparatus for a hydraulic traveling vehicle according to claim 12, wherein: the control means sets
the first flow rate of the hydraulic pump and the first displacement of the traveling system are set so that a flow rate necessary for the vehicle to travel at the preset maximum speed when the equivalent displacement of the traveling system including the hydraulic traveling motor is controlled to the first displacement agrees with the first flow rate of the hydraulic pump.

14. The traveling control apparatus for a hydraulic traveling vehicle according to claim 12, wherein:

the second control means controls the displacement of the hydraulic traveling motor to control the equivalent displacement of the traveling system including the hydraulic traveling motor.

15. The traveling control apparatus for a hydraulic traveling vehicle according to claim 12, further comprising:
a transmission provided at the output section of the hydraulic traveling motor;
wherein the second control means controls the equivalent displacement of the traveling system including the hydraulic traveling motor through changeover of the reduction gear ratio of the transmission.

16. The traveling control apparatus for a hydraulic traveling vehicle according to claim 12,
wherein the operating state determination means determines at least whether the traveling state is either the normal traveling state or the slope-descending state;
wherein, when the traveling state is the normal traveling state, the first and second control means and control the delivery rate of the hydraulic pump (10) to the first flow rate and the equivalent displacement of the traveling system including the hydraulic traveling motor to the first displacement; and
wherein, when the traveling state is the slope-descending state, the first and second control means and control the delivery rate of the hydraulic pump to the second flow rate and the equivalent displacement of the traveling system including the hydraulic traveling motor to the second displacement.

17. The traveling control apparatus for a hydraulic traveling vehicle according to claim 16,
wherein the operating state determination means (80, S100, and S120) further determines whether the traveling state is the deceleration state; and
wherein, when the traveling state is the deceleration state, the first and second control means and control the delivery rate of the hydraulic pump to the first flow rate and the equivalent displacement of the traveling system including the hydraulic traveling motor to the second displacement.

18. The traveling control apparatus for a hydraulic traveling vehicle according to claim 12,
wherein the operating state determination means determines at least whether the traveling state is either the normal traveling state or the acceleration state;
wherein, when the traveling state is the normal traveling state, the first and second control means and control the delivery rate of the hydraulic pump the first flow rate and the equivalent displacement of the traveling system including the hydraulic traveling motor (14) to the first displacement; and
wherein, when the traveling state is the acceleration state, the first and second control means and control the delivery rate of the hydraulic pump to the second flow rate and the equivalent displacement of the traveling system including the hydraulic traveling motor to the second displacement.

19. The traveling control apparatus for a hydraulic traveling vehicle according to claim 12,
wherein the operating state determination means determines at least whether the traveling state is either the normal traveling state or the slope-ascending state;
wherein, when the traveling state is the normal traveling state, the first and second control means and control the delivery rate of the hydraulic pump to the first flow rate and the equivalent displacement of the traveling system including the hydraulic traveling motor to the first displacement; and
wherein, when the traveling state is the slope-ascending state, the first and second control means and control the delivery rate of the hydraulic pump to the second flow rate and the equivalent displacement of the traveling system including the hydraulic traveling motor to the second displacement.

\* \* \* \* \*